(12) United States Patent
Ruddell et al.

(10) Patent No.: US 8,607,837 B2
(45) Date of Patent: Dec. 17, 2013

(54) APPARATUS FOR STRIPPING METAL FROM A CATHODE PLATE

(75) Inventors: Anthony John Ruddell, Cluden (AU); Per Ola Eriksson, Annandale (AU); Jason Cameron Schulte, Condon (AU); Gavin Jeffery Tang Sue Yek, Trinity Beach (AU)

(73) Assignee: Xstrata Technology Pty Ltd., Brisbane, Queensland (AU)

( * ) Notice: Subject to any disclaimer, the term of this patent is extended or adjusted under 35 U.S.C. 154(b) by 0 days.

(21) Appl. No.: 13/148,327

(22) PCT Filed: Feb. 5, 2010

(86) PCT No.: PCT/AU2010/000122
§ 371 (c)(1),
(2), (4) Date: Oct. 20, 2011

(87) PCT Pub. No.: WO2010/088737
PCT Pub. Date: Aug. 12, 2010

(65) Prior Publication Data
US 2012/0037319 A1 Feb. 16, 2012

(30) Foreign Application Priority Data
Feb. 6, 2009 (AU) .................................. 2009900477

(51) Int. Cl.
*B32B 38/00* (2006.01)

(52) U.S. Cl.
USPC ........ 156/759; 156/715; 156/716; 29/603.02; 29/402.03; 29/403.2; 29/426.1; 29/426.2; 29/426.3; 29/426.4; 29/426.5; 29/564.1; 29/564.3; 29/762; 29/763; 29/764; 29/221.6; 29/239

(58) Field of Classification Search
None
See application file for complete search history.

(56) References Cited

U.S. PATENT DOCUMENTS

| | | | | |
|---|---|---|---|---|
| 3,996,127 A | * | 12/1976 | Rautimo et al. | 204/281 |
| 4,840,710 A | | 6/1989 | Middlin et al. | |
| 5,567,285 A | | 10/1996 | Sitges Menendez et al. | |
| 7,306,706 B2 | * | 12/2007 | Robinson et al. | 204/279 |
| 7,551,981 B2 | | 6/2009 | Salamanca | |
| 7,746,018 B2 | | 6/2010 | Salamanca | |
| 2007/0144006 A1 | | 6/2007 | Salamanca | |
| 2007/0144894 A1 | | 6/2007 | Salamanca | |
| 2007/0147961 A1 | | 6/2007 | Salamanca | |
| 2010/0106288 A1 | * | 4/2010 | Strass | 700/218 |

FOREIGN PATENT DOCUMENTS

| | | |
|---|---|---|
| CA | 2178776 A1 | 12/1997 |
| CL | 1048-2004 | 5/2004 |
| CL | 2658-2005 | 10/2005 |
| CL | 2655-2005 | 1/2007 |
| CL | 2656-2005 | 1/2007 |
| CL | 2654-2005 | 12/2007 |
| JP | 2008-274354 A | 11/2008 |
| JP | 2009-215598 A | 9/2009 |
| WO | WO 00/32846 | 6/2000 |
| WO | WO 2009/018602 A1 | 9/2009 |

* cited by examiner

*Primary Examiner* — Mark A Osele
*Assistant Examiner* — Nickolas Harm
(74) *Attorney, Agent, or Firm* — Bishop Diehl & Lee, Ltd.

(57) ABSTRACT

An apparatus for stripping metal from a cathode plate, the apparatus comprising stripping means adapted for positioning between the metal and the cathode plate in order to separate the metal from the cathode plate, and wherein movement of the stripping means is achieved through movement of a robotic arm.

8 Claims, 21 Drawing Sheets

APPARATUS FOR STRIPPING METAL FROM A CATHODE PLATE

FIELD OF THE INVENTION

The present invention relates to an apparatus for stripping metal from a cathode plate. The present invention also relates to a method for stripping metal from a cathode plate.

BACKGROUND ART

Production of metal using electrochemical processes involves deposition of the metal on a cathode plate. For example, in the electrowinning or electrorefining of copper, copper metal is deposited on to stainless steel cathode plates. When the deposited copper metal has grown to a desired thickness, the cathode plate is removed from the electrolysis cell and the deposited metal is stripped from the cathode plate.

Stripping of the deposited metal from the cathode plate is desirably conducted using a largely automated process in order to achieve high throughput in the stripping plant. For example, in U.S. Pat. No. 4,840,710, the entire contents of which are incorporated herein by cross-reference, a method for stripping electrically deposited copper from a cathode is described. In this method, the cathode is flexed by an amount exceeding the strength of the adhesion bond between the deposited metal and the cathode, but not exceeding the elastic limit of the cathode. This causes at least part of the deposited metal to separate from the cathode, leaving a gap between that part of the deposited metal and the cathode. The deposited metal is then stripped from the cathode by use of wedges that slide along the surface of the cathode and the deposited metal. The use of wedges to strip the metal from the cathode involves the wedge moving in an up and down motion. The wedges prise the metal away from the cathode plate such that the angle between the metal and the cathode plate is typically between 15-25 degrees. Grippers are then used to grip the metal when in this position and pivot the metal around the bottom of the cathode plate to a horizontal position. The wedges are typically much smaller than the cathode in terms of height and width, which, when used in conjunction with grippers, sometimes produce a bow at the bottom of the stripped metal. U.S. Pat. No. 4,840,710 also describes the use of gas blasting to strip the deposited metal from the cathode.

The method of U.S. Pat. No. 4,840,710 has been commercially implemented in a number of copper plants around the world and this method forms part of the ISA PROCESS™ technology commercially available from the present applicant.

When metal is deposited on cathode plates, edge strips are typically placed on the vertical edges of the cathode plates in order to prevent metal being deposited along the vertical or side edges of the cathode plates. As a result, sheets of metal are deposited on either side of the cathode plate. These sheets of metal on either side of the cathode plate are not joined to each other along their vertical edges.

In some plants, the bottom edge of the cathode plates are covered in wax or fitted with bottom strips prior to deposition of metal thereon. This prevents the deposition of metal along the bottom edge of the cathode plates and, consequently, the sheets of metal that are deposited on either side of cathode plate remain separate from each other.

In other plants, the bottom edge of the cathode plates are not waxed or fitted with bottom strips prior to deposition of metal, which results in metal also being deposited along the bottom edge of the cathode plate. The cathodes may be provided with a substantially flat bottom edge (for instance if it is not desired to break the metal deposited along the bottom edge) or, alternatively, the bottom edge may be provided with notches, grooves or the like. This last-mentioned type of cathode is designed to assist in the stripping of the metal from the cathode, as described in Australian Patent No. 768314. In that case, the cathode is designed for the electro-depositing of a metal thereon. The cathode is designed with a groove on the bottom thereof, with metal being deposited thereon to form a frangible portion. The groove is shaped so that a line of weakness is formed in the metal deposited within the groove, such that separation of the two sheets of deposited metal is initiated upon the line of weakness. In these plants, the sheets of deposited metal on either side of the cathode plate are connected to each other by the metal that is deposited along the bottom edge. During stripping of cathodes in which metal is deposited along the bottom edge as well as on either side of the cathode plate, the wedges push the sheets of metal away from the sides of the cathode plate out to grippers, to an approximate angle of 15-20 degrees. The grippers then bring the copper to the horizontal position and pull it for separation.

However, if the metal that has deposited on the bottom edge of the cathode plate does not break during the initial stripping operation, it is necessary to flex the sheets upwardly and then downwardly until that metal breaks. Grippers are then used to flex the sheets of metal upwardly and downwardly until the interconnecting metal between the sheets breaks.

It will be clearly understood that, if a prior art publication is referred to herein, this reference does not constitute an admission that the publication forms part of the common general knowledge in the art in Australia or in any other country.

Throughout this specification, the term "comprising" and its grammatical equivalents shall be taken to have an inclusive meaning unless the context of use indicates otherwise.

SUMMARY OF THE INVENTION

It is an object of the present invention to provide an apparatus and a method which may overcome at least some of the abovementioned disadvantages, or provide a useful or commercial choice.

In a first aspect, the invention resides broadly in an apparatus for stripping metal from a cathode plate, the apparatus comprising stripping means adapted to be positioned between the metal and the cathode plate when separating the metal from the cathode plate, and wherein movement of the stripping means is achieved through movement of a robotic arm.

There are a number of significant benefits to stripping metal from cathode plates using a robotic arm. For instance, using a robotic arm allows the metal to be stripped from the cathode plate at a point closer to the bottom of the cathode plate than was previously possible. Further, a robotic arm may allow movement in a number of directions.

The robotic arm manoeuvring the stripping means partially or entirely supports the inside surface of the metal while pivoting the metal about a pivot point at the bottom of the cathode plate. This prevents the metal from bending outside the bottom section. In addition, the mechanical forces generated by the pivoting motion are concentrated at the deposited metal interconnecting the two metal sheets. By concentrating the forces in this manner, more successful separation may be achieved.

The metal that is to be stripped from the cathode plate may be two sheets that are not joined in any manner, or they may be attached by a join at the bottom of the plate.

The orientation of the cathode plate during stripping is normally with the bottom of the cathode facing the bottom, and the hanger bar at the top. However the cathode can be stripped with the hanger bar at the bottom and the bottom of the cathode facing upwards. Alternatively, the cathode could be stripped at any angle in between.

The cathode in the stripping operation can be supported by the hanger bar, the bottom of the cathode plate, or a combination thereof.

The stripping means may be of any suitable form. Preferably, however, the stripping means is adapted to be mounted to a robotic arm. The stripping means may be mounted directly to the robotic arm or may be mounted indirectly with one or more intermediate portions between the robotic arm and the stripping means.

The stripping means may be any means adapted to separate the metal from the cathode plate. For instance, the stripping means may comprise at least one roller. In some embodiments of the invention, the at least one roller is positioned in the gap between the metal and the cathode plate and along the cathode plate or the metal to cause stripping of the metal from the cathode plate.

The at least one roller may comprise a stand alone roller. Alternatively, the at least one roller may form part of a larger structure. For example, the at least one roller may be mounted inside a housing or a body, with a part of the roller coming into contact with the cathode plate or the metal and the housing or body coming into contact with the other of the cathode plate or the metal. Alternatively, the at least one roller may be mounted to a frame. The at least one roller may be a wheel.

It will be appreciated that the at least one roller is positioned between the cathode plate and the metal that has been deposited on the cathode plate. Consequently, when the robotic arm is actuated to drive the roller along the cathode plate or the metal (or both), the at least one roller pushes the metal away from the cathode plate to thereby strip the metal from the cathode plate.

Preferably, at least a portion of the force applied to the metal by the at least one roller is applied at or adjacent the intended separation point at the bottom of the cathode plate.

It is preferred that the apparatus includes at least one roller on one or both sides of the cathode plate for positioning in the gap between the metal and the cathode plate.

In some embodiments, the apparatus may comprise at least two rollers positioned on one or both sides of the cathode plate, with one of the least two rollers being in contact with the cathode plate and one of the at least two rollers being in contact with the metal. In this embodiment, the rollers that are in contact with the cathode plate act to locate and guide the rollers whilst the rollers that are in contact with the metal act to force the metal away from the cathode plate as the drive means is operated to drive the rollers along the cathode plate. Suitably, the at least two rollers are mounted in fixed relationship to each other.

The rollers may comprise any suitable rollers. For example, the rollers may be metal rollers, they may be made from an elastomeric or polymeric material or they may have an elastomeric or polymeric coating thereon.

In embodiments of the present invention where the bottom edge of the cathode plate is not treated to prevent metal being deposited thereon, one or more further rollers located externally to the deposited metal may be provided. The external rollers may be brought into contact with the external surface of the sheets of metal in the event that the interconnecting metal between the sheets of metal does not break during stripping. The external rollers may then be used to flex the sheets of metal upwardly to assist in breaking the interconnecting metal. Thus, the one or more external rollers may be adapted to be brought into contact with an external surface of the metal if metal interconnecting the metal deposited on opposing side of the cathode plate does not break during stripping.

In some instances, the external rollers may be arranged such that they move in concert with the stripping rollers. For example, the external rollers may be mounted to a cradle or a frame that also mounts the stripping rollers. In this embodiment, the external rollers may be biased, such as by spring loading or other mechanisms, so that the external rollers remain in contact with the outside or external surface of the metal being stripped. In this embodiment, the external rollers act to support the sheets of metal that are being stripped from the cathode plate during the stripping operation. This can allow for improved handling of the stripped metal sheets. Further, should any interconnecting metal between the sheets of metal not break during initial stripping, the robotic arm can be actuated to raise the roller assemblies. As the external rollers are in contact with the external surface of the metal sheets, this causes the metal sheets to flex upwardly. Therefore, flexing of the metal sheets in the upwards and downwards direction can be easily achieved should the interconnecting metal not break during initial stripping.

In other embodiments, the external rollers may be operated independently to the stripping rollers In an alternative embodiment of the invention, the stripping means may include one or more insertion means. The insertion means may be adapted for insertion between the metal and the cathode plate in order to separate at least a portion of the metal from the cathode plate. Any suitable insertion means may be provided, such as, but not limited to, one or more pincers, knives, chisels, wedges or the like, or any combination thereof. In some embodiments complementary means may be provided, the complementary means adapted to be positioned adjacent the external surface of the metal such that the insertion means and the complimentary means form, for instance, a pair of pincers adapted to grip at least a portion of the metal.

In some embodiments of the invention, one or more insertion means are present. In this embodiment of the invention, the insertion means are preferably spaced apart from one another such that the insertions means may be inserted into the gap between the metal and the cathode plate at points along at least a portion of the width of the cathode plate in order to ensure that the entire width of the metal is separated from the cathode plate.

In some embodiments of the invention, the insertion means may be held in a fixed relationship to the stripping means. Alternatively, the insertion means may be capable of movement relative to the stripping means.

In some embodiments of the invention, the shape of the stripping means may be such that driving the stripping means between the metal and the cathode plate is sufficient to result in the stripping of the metal from the cathode plate. For instance, the stripping means may comprise a wedge-shaped portion, wherein the wedge-shaped portion is driven point-first between the metal and the cathode plate. As the wedge-shaped portion is driven along the metal, the diverging sides of the wedge-shaped portion result in the stripping of the metal from the cathode plate. In embodiments of the invention in which a wedge-shaped portion is used, it is preferred that the tip of the wedge-shaped portion is driven to the bottom of the cathode plate.

In a preferred embodiment of the invention, the dimensions of the wedge-shaped portion are such that the only a relatively small angle between the cathode and the metal sheet is created, even when the wedge-shaped portion is driven to the bottom of the cathode plate. In a preferred embodiment of the invention, the angle between the metal sheet and the cathode plate is no more than 20°, more preferably no more than 15°, and most preferably between about 10° and 12° when the wedge-shaped portion is driven to the bottom of the cathode plate. In a preferred embodiment of the invention, the relatively low angle between the metal sheet and the cathode plate is achieved by providing the wedge-shaped portion with a relatively low angle between the sides of the wedge-shaped portion that converge at the tip of the wedge. Preferably the angle between the sides of the wedge-shaped portion is no more than 20°, more preferably no more than 15°, and most preferably between about 10° and 12°.

By maintaining a relatively low angle between the cathode plate and the metal during stripping (preferably by providing a wedge-shaped portion with a relatively low angle between the sides that converge at the tip of the wedge), outward bending or flexing of the metal (particularly above the interconnecting metal between the metal sheets) may be reduced or prevented.

Further, it is preferred that the dimensions of the wedge-shaped portion are such that the height of the wedge-shaped portion is approximately equal to the height of the metal sheet and the width of the wedge-shaped portion is approximately equal to the width of the cathode plate. In this way, contact between the metal and the wedge-shaped portion may be maximised, and the stripping process may be performed with high efficiency.

In some embodiments of the invention, a plurality of wedge-shaped portions may be provided. For instance, in one preferred embodiment of the invention, four wedge-shaped portions may be provided. Preferably, when multiple wedge-shaped portions are present, the wedge-shaped portions are spaced approximately equidistantly from one another across the width of the cathode plate.

Preferably, the stripping means are driven substantially vertically downwards into the gap between the metal and the cathode plate. While in some embodiments of the invention, driving the wedge-shaped portion into the gap between the metal and the cathode plate may be sufficient to cause the separation of the metal from the cathode plate, in other embodiments of the invention, the stripping means may be provided with one or more rollers to reduce friction as the stripping means is driven into the gap between the metal and the cathode plate. In one embodiment of the invention, the stripping means comprises a pair of rollers. In this embodiment of the invention, it is preferred that one of said pair of rollers is adapted to contact the internal face of the metal, while the second of said pair of roller is adapted to contact the surface of the cathode plate. In some embodiments of the invention, the one or more rollers may be adapted to be located at or adjacent an vertical edge of the metal when the apparatus is in use. In a preferred embodiment of the invention, one or more rollers are adapted to be located at each of the vertical edges of the metal. In this embodiment of the invention, the wedge-shaped portion is located intermediate the one or more rollers adapted to be located at each of the vertical edges of the metal.

In some embodiments, the cathode plate may be provided with an elongate member located at or adjacent the lower horizontal edge of the cathode plate. Any suitable elongate member may be provided, such as, but not limited to, a shaft, bar or the like. Preferably, the elongate member extends beyond the vertical edges of the cathode plate. Alternatively, the elongate member may comprise a portion of a stripping station to which the cathode is moved when stripping of the metal is desired. The cathode may be positioned within the stripping station in such a way that the elongate member is located at or adjacent the lower horizontal edge of the cathode plate. In some embodiments of the invention, a pair of elongate members may be provided, for instance one elongate member on either side of the cathode plate.

In this embodiment of the invention, the stripping means may be provided with one or more engagement means adapted to engage with the elongate member. The engagement means may be of any suitable form, although in a preferred embodiment of the invention the engagement means comprise a complementary-shaped portion adapted to engage with the elongate member, such as, but not limited to, a U-shaped, semi-circular, arcuate, square or rectangular portion. In a preferred embodiment of the invention, the stripping means is provided with a pair of engagement means wherein the wedge-shaped portion is located intermediate the pair of engagement means, such that the first engagement means engages the elongate member at or adjacent a first end of the elongate member and the second engagement means engages the elongate member at or adjacent a second end of the elongate member.

Once the engagement means are engaged with the elongate member, the stripping means may be pivoted (repeatedly if necessary) about the elongate member should the metal sheet not immediately separate from the cathode plate, and until such time as separation occurs. Thus, the engagement of the engagement means with the elongate member allows the metal sheet and stripping means to be pivoted smoothly and precisely about the elongate member until the metal sheet separates from the cathode plate. Preferably, pivoting of the metal occurs when the stripping means has reached its lowest position at the bottom of the cathode plate and the metal is supported by the stripping means.

In another embodiment, the stripping means comprises at least one roller that contacts the cathode plate and at least one projection that contacts the metal. The projection may comprise a wedge-shaped projection. The projection may project below the at least one roller. In this embodiment, the at least one roller contacts the cathode plate, thereby minimising damage to the cathode plate. This is desirable as the cathode plates are re-used many times.

Any suitable robotic arm may be used in the present invention. However, it is preferred that the robotic arm is of a suitable construction to be capable of performing the movements (e.g. bending and/or pivoting) that are required to strip the metal from the cathode. Thus, it is preferred that the robotic arm is provided with one or more hinged portions that allow the robotic arm to make the necessary movements.

The robotic arm may be powered using any suitable source of energy, such as, but not limited to, batteries, mains power, generators, solar power or the like, or any combination thereof.

The stripping means may be formed integrally with the robotic arm, or the robotic arm may be adapted to allow the stripping means to be attached thereto. The stripping means may be attached to the robotic arm using any suitable technique. Typically, the stripping means is likely to be connected to the robotic arm by bolts, nuts or the like.

While it has been stated that the robotic arm must be capable of pivoting and/or bending movement, it is most preferred that the robotic arm is capable of moving in such a manner as to pivot the stripping means between a vertical position (in which the stripping means is driven downwardly between the metal and the cathode plate) and a position which is at least perpendicular to the vertical position, or, more preferably, a position which is at an obtuse angle to the vertical position of the stripping means. Thus, in a preferred embodiment, the robotic arm is adapted to pivot the stripping means from up to 180° from a vertical position in which the stripping means is facing downwardly, to a vertical position in which the stripping means is facing upwardly. More preferably, the robotic arm is adapted to pivot the stripping means from a vertical position in which the stripping means is facing downwardly to an angle of about 150° to this vertical position.

In a second aspect, the present invention provides a method for stripping metal from a cathode plate comprising the steps of causing at least part of the metal to separate from the cathode plate and form a gap between the cathode plate and the metal, positioning stripping means associated with a robotic arm in the gap between the metal and the cathode plate and actuating the robotic arm to drive the stripping means along the cathode plate or the metal to thereby strip the metal from the cathode plate.

In the method of the second aspect of the present invention, the method may include the step of flexing the cathode plate to cause at least part of the metal to separate from the cathode plate.

The present invention also encompasses a stripping apparatus in which the grippers that are used to grip the metal in present stripping plants are replaced with one or more rollers that come into contact with the external surface of the metal in the event that any interconnecting metal between the sheets of metal do not break during initial stripping.

Accordingly, in a third aspect, the present invention provides an apparatus for stripping metal from a cathode plate in which a sheet of metal is deposited on either side of the cathode plate and interconnecting metal that forms a bridge between the sheets of metal on either side of the cathode plate is deposited along the bottom edge of the cathode plate, the apparatus comprising stripping means associated with a robotic arm for separating the sheets of metal on either side of the cathode plate from the cathode plate, and wherein the movement of the robotic arm pushes the sheets of metal to thereby cause the sheets of metal to flex about the interconnecting metal in the event that the interconnecting metal does not break during stripping.

In another embodiment of the present invention, the apparatus may be provided with one or more gripping means adapted to prevent the metal from falling once stripping of the metal from the cathode plate begins. Any suitable gripping means may be used, although in preferred embodiments of the invention the gripping means may comprise one or more clamps, suction devices, or the like, or any combination thereof. In some embodiments of the invention, the one or more clamps may be electronic, hydraulic or pneumatic, or any combination thereof.

Preferably, the one or more gripping means are adapted to come into contact with an external surface of the metal. In some embodiments of the invention, the gripping means may be adapted to be actuated only if the metal sheet does not separate from the cathode plate such that the metal sheet must be flexed about the interconnecting metal in order to separate the metal sheets. Actuation of the gripping means may be achieved using any suitable technique, although in a preferred embodiment of the invention, the gripping means may be actuated using hydraulics or pneumatics.

The gripping means may be located in any suitable position. However, in a preferred embodiment of the invention, the gripping means may be adapted to engage with a lower region of the metal sheet. It is preferred that the gripping means engages with a lower region of the metal sheet as gripping (and subsequently pulling) the metal sheet from an upper region may result in bending of the metal sheet.

In a fourth aspect, the present invention provides a method for stripping metal from a cathode plate in which a sheet of metal is deposited on either side of the cathode plate and interconnecting metal that forms a bridge between the sheets of metal on either side of the cathode plate is deposited along the bottom edge of the cathode plate, the method comprising the steps of causing at least a part of the deposited sheets of metal to separate from the cathode plate, stripping the sheets of metal from the cathode plate using a pair of robotic arms, wherein one robotic arm is located on each side of the cathode plate, and, in the event that the interconnecting metal does not break during initial stripping, using the robotic arms to push the sheets of metal towards each other.

In the method of the fourth aspect of the present invention, the method may include the step of flexing the cathode plate to cause at least part of the metal to separate from the cathode plate.

In all aspects of the present invention, a flexing station, which flexes the cathodes prior to stripping of the metal sheets from the cathodes, will be provided. The flexing station flexes the cathodes and breaks the adhesion bond between the cathode and at least part of the metal. This may be achieved, for example, in accordance with the method described in U.S. Pat. No. 4,840,710, or by using a stripping element that is turnably moveable in the vertical direction of the cathode as described in PCT/FI2004/000719 (WO 2005/054546 A1). Any other flexing operation known to the person skilled in the art or described in the literature may also be used to form the gaps.

In order to maintain the gap between the cathode plate and the metal, one or more wedges may be inserted between the metal and the cathode plate. An example in this regard is given in FIGS. 12 and 13 of Australian patent number 625243. Alternatively, one or more arms may be inserted between the metal and the cathode plate and the arms pulled away slightly from the cathode plate to maintain the gap between the metal and the cathode plate.

The present invention may be used in both the electrowinning and electro-refining plants. It has been found that, in plants where the bottom edge of the cathode plate is not protected against electrodeposition of metal and therefore an interconnecting bridge of metal is deposited on the bottom edge, the interconnecting metal tends to break more easily in the electrowinning plants then in electrorefining plants due to process differences.

In another aspect, the invention resides broadly in an apparatus for stripping metal from a cathode plate in which part of the metal has been separated from the cathode plate to form a gap between the part of the metal and the cathode plate, the apparatus comprising one or more insertion means adapted for insertion between the metal and the cathode plate, the one or more insertion means being associated with a robotic arm, and at least one roller for positioning in the gap between the metal in the cathode plate and drive means for driving the at least one roller along the cathode plate or the metal to cause stripping of the metal from the cathode plate.

In some embodiments, the apparatus may comprise at least two rollers positioned on one or both sides of the cathode plate, with one of the least two rollers being in contact with the cathode plate and one of the at least two rollers being in contact with the metal. In this embodiment, the rollers that are in contact with the cathode plate act to locate and guide the rollers whilst the rollers that are in contact with the metal act to force the metal away from the cathode plate as the drive means is operated to drive the rollers along the cathode plate. Suitably, the at least two rollers are mounted in fixed relationship to each other.

The rollers may comprise any suitable rollers. For example, the rollers may be metal rollers, they may be made from an elastomeric or polymeric material or they may have an elastomeric or polymeric coating thereon.

In some embodiments of the present invention, one or more further rollers located externally to the deposited metal may be provided. The external rollers may be brought into contact with the external surface of the sheets of metal in the event that the interconnecting metal between the sheets of metal does not break during stripping. The external rollers may then be used to flex the sheets of metal upwardly to assist in breaking the interconnecting metal.

In some instances, the external rollers may be arranged such that they move in concert with the stripping rollers. For example, the external rollers may be mounted to a cradle or a frame that also mounts the stripping rollers. In this embodiment, the external rollers may be biased, such as by spring loading or other mechanisms, so that the external rollers remain in contact with the outside surface of the metal being stripped. In this embodiment, the external rollers act to support the sheets of metal that are being stripped from the cathode plate during the stripping operation. This can allow for improved handling of the stripped metal sheets. As the external rollers are in contact with the external surface of the metal sheets, this causes the metal sheets to flex upwardly. Therefore, flexing of the metal sheets in the upwards and downwards direction can be easily achieved should the interconnecting metal not break during initial stripping.

In other embodiments, the external rollers may be operated independently to the stripping rollers.

As previously mentioned, the one or more insertion means are adapted for insertion between the metal and the cathode plate. This results in the separation of at least a portion of the metal from the cathode plate. Any suitable insertion means may be provided, such as, but not limited to, one or more pincers, knives, chisels, wedges or the like, or any combination thereof. In some embodiments complementary means may be provided, the complementary means adapted to be positioned adjacent the external surface of the metal such that the insertion means and the complimentary means form, for instance, a pair of pincers adapted to grip at least a portion of the metal.

In some embodiments of the invention, a plurality of insertion means may be present. In this embodiment of the invention, the insertion means are preferably spaced apart from one another such that the insertions means may be inserted into the gap between the metal and the cathode plate at points along at least a portion of the width of the cathode plate in order to ensure that the entire width of the metal is separated from the cathode plate.

In some embodiments of the invention, the insertion means may be held in a fixed relationship to the at least one roller. Alternatively, the insertion means may be capable of movement relative to the at least one roller.

In another aspect, the invention resides broadly in an apparatus for stripping metal from a cathode plate in which part of the metal has been separated from the cathode plate to form a gap between the part of the metal and the cathode plate, the apparatus comprising stripping means associated with a robotic arm adapted for positioning between the metal and the cathode plate and drive means for driving the stripping means along the cathode plate or the metal to cause stripping of the metal from the cathode plate.

The stripping means may be of any suitable shape, size or configuration. Preferably, however, the shape of the stripping means may be such that driving the stripping means between the metal and the cathode plate is sufficient to result in the stripping of the metal from the cathode plate. For instance, the stripping means may comprise a wedge-shaped portion, wherein the wedge-shaped portion is driven point-first between the metal and the cathode plate. As the wedge-shaped portion is driven along the metal, the diverging sides of the wedge-shaped portion result in the stripping of the metal from the cathode plate. In embodiments of the invention in which a wedge-shaped portion is used, it is preferred that the tip of the wedge-shaped portion is driven to the bottom of the cathode plate.

In a preferred embodiment of the invention, the dimensions of the wedge-shaped portion are such that the only a relatively small angle between the cathode and the metal sheet is created, even when the wedge-shaped portion is driven to the bottom of the cathode plate. In a preferred embodiment of the invention, the angle between the metal sheet and the cathode plate is no more than 20°, more preferably no more than 15°, and most preferably between about 10° and 12° when the wedge-shaped portion is driven to the bottom of the cathode plate. In a preferred embodiment of the invention, the relatively low angle between the metal sheet and the cathode plate is achieved by providing the wedge-shaped portion with a relatively low angle between the sides of the wedge-shaped portion that converge at the tip of the wedge. Preferably the angle between the sides of the wedge-shaped portion is no more than 20°, more preferably no more than 15°, and most preferably between about 10° and 12°.

By maintaining a relatively low angle between the cathode plate and the metal during stripping (preferably by providing a wedge-shaped portion with a relatively low angle between the sides that converge at the tip of the wedge), outward bending or flexing of the metal (particularly above the interconnecting metal between the metal sheets) may be reduced or prevented Further, it is preferred that the dimensions of the wedge-shaped portion are such that the height of the wedge-shaped portion is approximately equal to the height of the metal sheet and the width of the wedge-shaped portion is approximately is approximately equal to the width of the cathode plate. In this way, contact between the metal and the wedge-shaped portion may be maximised, and the stripping process may be performed with high efficiency.

In some embodiments of the invention, a plurality of wedge-shaped portions may be provided. For instance, in one preferred embodiment of the invention, four wedge-shaped portions may be provided. Preferably, when multiple wedge-shaped portions are present, the wedge-shaped portions are spaced approximately equidistantly from one another across the width of the cathode plate.

Preferably, the stripping means are driving substantially vertically downwards into the gap between the metal and the cathode plate. While in some embodiments of the invention, driving the wedge-shaped portion into the gap between the metal and the cathode plate may be sufficient to cause the separation of the metal from the cathode plate, in other embodiments of the invention, the stripping means may be provided with one or more rollers to reduce friction as the stripping means is driven into the gap between the metal and the cathode plate. In one embodiment of the invention, the stripping means comprises a pair of rollers. If the stripping means comprises a pair of rollers, it is preferred that one of said pair of rollers is adapted to contact the internal face of the metal, while the second of said pair of roller is adapted to contact the surface of the cathode plate. In some embodiments of the invention, the one or more rollers may be adapted to be located at or adjacent an vertical edge of the metal when the apparatus is in use. In a preferred embodiment of the invention, one or more rollers are adapted to be located at each of the vertical edges of the metal. In this embodiment of the invention, the wedge-shaped portion is located intermediate the one or more rollers adapted to be located at each of the vertical edges of the metal.

In some embodiments, the cathode plate may be provided with an elongate member located at or adjacent the lower horizontal edge of the cathode plate. Any suitable elongate member may be provided, such as, but not limited to, a shaft, bar or the like. Preferably, the elongate member extends beyond the vertical edges of the cathode plate. Alternatively, the elongate member may comprise a portion of a stripping station to which the cathode is moved when stripping of the metal is desired. The cathode may be positioned within the stripping station in such a way that the elongate member is located at or adjacent the lower horizontal edge of the cathode plate. In some embodiments of the invention, a pair of elongate members may be provided, for instance one elongate member on either side of the cathode plate In this embodiment of the invention, the stripping means may be provided with one or more engagement means adapted to engage with the elongate member. The engagement means may be of any suitable form, although in a preferred embodiment of the invention the engagement means comprise a complementary-shaped portion adapted to engage with the elongate member, such as, but not limited to, a U-shaped, semi-circular, arcuate, square or rectangular portion. In a preferred embodiment of the invention, the stripping means is provided with a pair of engagement means wherein the wedge-shaped portion is located intermediate the pair of engagement means, such that the first engagement means engages the elongate member at or adjacent a first end of the elongate member and the second engagement means engages the elongate member at or adjacent a second end of the elongate member.

Once the engagement means are engaged with the elongate member, the stripping means may be pivoted about the elongate member should the metal sheet not immediately separate from the cathode plate. Thus, the engagement of the engagement means with the elongate member allows the metal sheet and stripping means to be pivoted smoothly and precisely about the elongate member until the metal sheet separates from the cathode plate.

In another embodiment, the stripping means comprises at least one roller that contacts the cathode plate and at least one projection that contacts the metal. The projection may comprise a wedge-shaped projection. The projection may project below the at least one roller. In this embodiment, the at least one roller contacts the cathode plate, thereby minimising damage to the cathode plate. This is desirable as the cathode plates are re-used many times.

Any suitable drive means may be used to drive the stripping means, such as, but not limited to, pneumatic rams, hydraulic rams, electric drives, mechanical drives, worm drives, rack and pinion drives, jack drives, robotics or the like, or any combination thereof. Some suitable drive means are described in the Applicant's co-pending international patent application no. PCT/AU2008/001107, the contents of which are hereby incorporated by reference.

It will be understood that, while in some aspects of the invention it is desirable to pivot the metal sheets until such time as the metal bridging the metal sheets deposited on opposite sides of the cathode is broken and separation of the metal sheets occurs, this may not always be the case. For instance, in some embodiments of the invention, it may be desirable to strip the metal sheets from opposite sides of the cathode plates without breaking the bridge of metal interconnecting the metal sheets. Thus, in this embodiment of the invention, the metal sheets may be stripped from the cathode, and the robotic arm may pivot in order to push the metal sheets into proximity with one another without breaking the metal bridge interconnecting the metal sheets. The interconnected metal sheets may then be transferred to a stockpile or the like for further handling or processing.

Thus in yet another aspect, the invention resides broadly in a method for stripping metal from a cathode plate in which a sheet of metal is deposited on either side of the cathode plate and interconnecting metal that forms a bridge between the sheets of metal on either side of the cathode plate is deposited along the bottom edge of the cathode plate, the method comprising the steps of causing at least a part of the deposited sheets of metal to separate from the cathode plate, stripping the sheets of metal from the cathode plate using a pair of robotic arms, wherein one robotic arm is located on each side of the cathode plate, and using the robotic arms to push the sheets of metal towards each other without breaking the interconnecting metal.

BRIEF DESCRIPTION OF THE DRAWINGS

An embodiment of the invention will be described with reference to the following drawings in which.

DETAILED DESCRIPTION OF THE DRAWINGS

Figure 1:
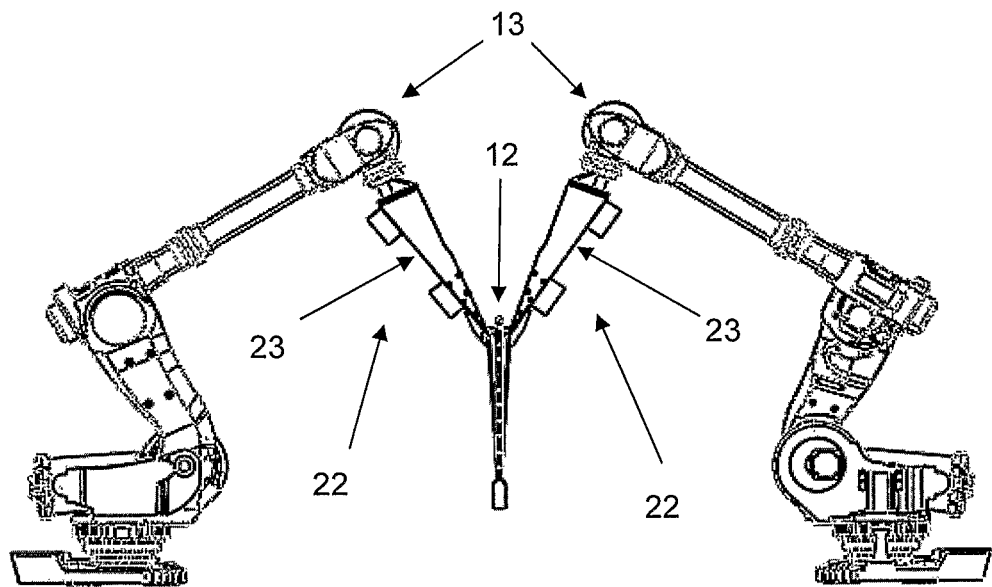
FIGS. 1-13 illustrate a method and apparatus for stripping metal from a cathode plate according to an embodiment of the present invention.

It will be appreciated that the drawings have been provided for the purposes of illustrating preferred embodiments of the present invention and that the invention should not be considered to be limited solely to the features as shown in the drawings.

In FIG. 1, an embodiment of the present invention is shown. In this Figure, a pair of robotic arms 13 are provided, with one robotic arm 13 located on each side of a cathode plate 12. The stripping means 22 comprises a wedge-shaped portion 23.

Figure 2:
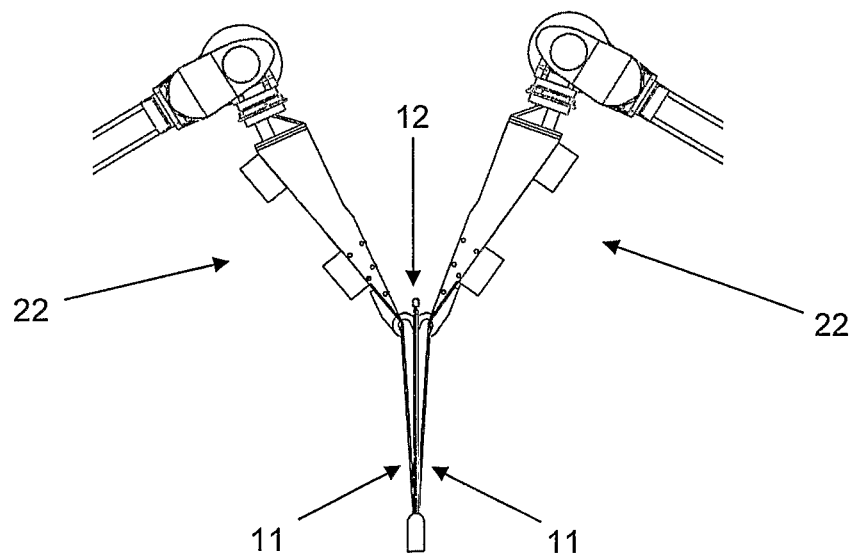

In FIG. 2 a more detailed view of that shown in FIG. 1 may be seen. In this Figure, the stripping means 22 is inserted between the metal 11 and the cathode plate 12 in order to widen the gap between the metal 11 and the cathode plate 12, the gap being created by flexing the cathode plate 12 prior to stripping.

Figure 3:
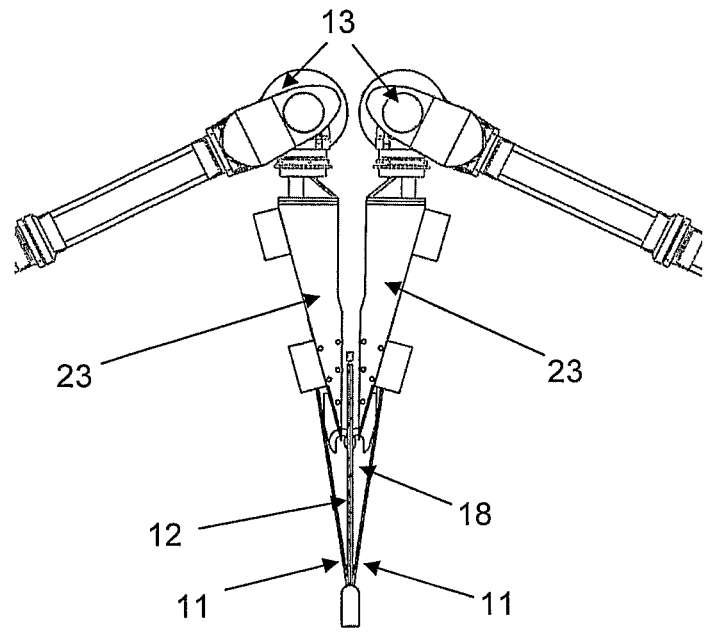
Figure 4:
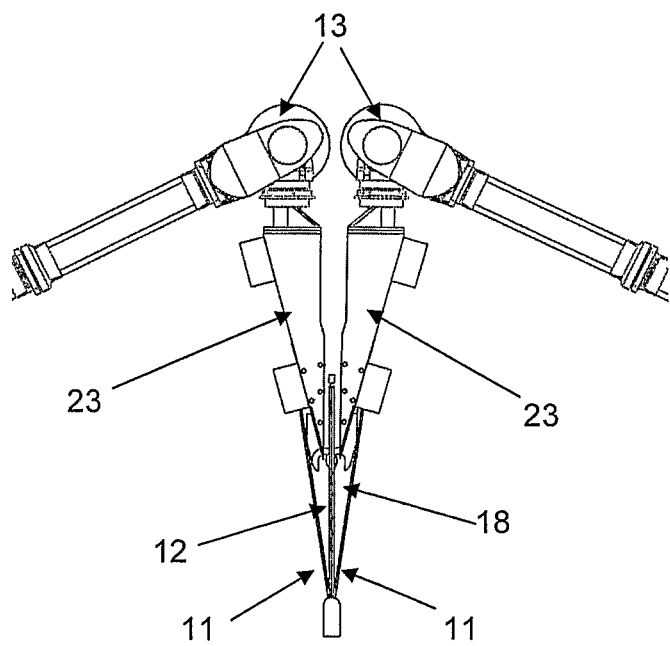
Figure 5:
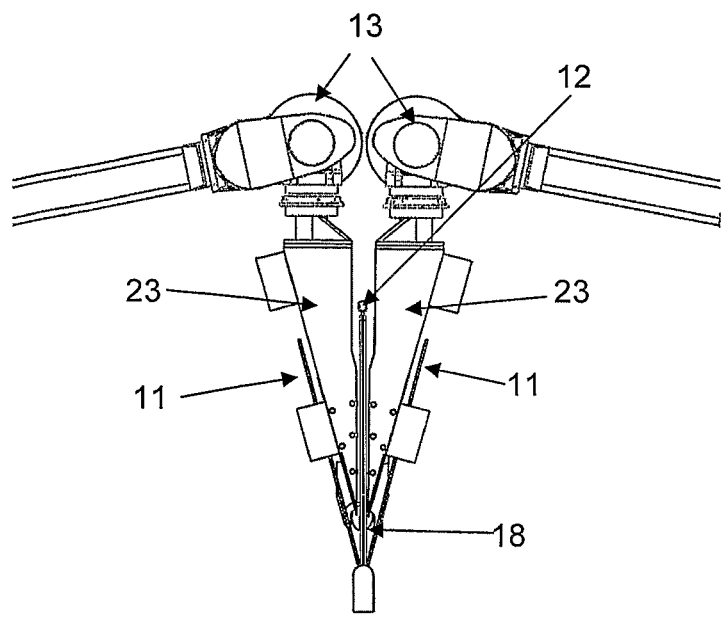

Turning now to FIGS. 3-5, once the wedge-shaped portions 23 are in a substantially vertical position, the robotic arms 13 drive downwards, widening the gap 18 between the metal 11 and the cathode plates 12.

In the embodiment of the invention shown in FIGS. 3-5, the stripping means 22 comprises a pair of rollers (obscured) one of which is adapted to contact the internal face of the metal 11 and the second of which is adapted to contact the surface of the cathode plate 12 as the stripping means 22 is driven into the gap 18 between the metal 11 and the cathode plate 12.

Figure 6:
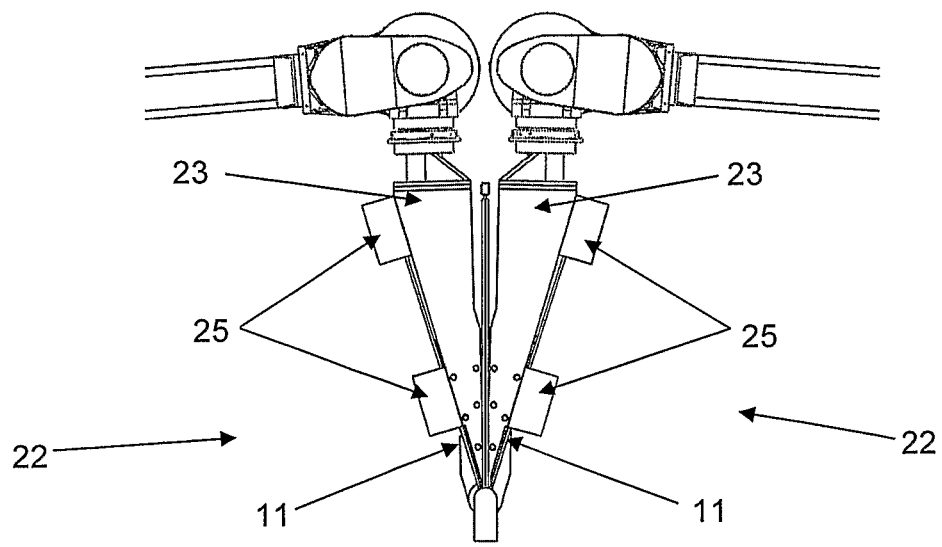

As the stripping means 22 reaches the bottom of the cathode plate 12 (illustrated in FIG. 6), the metal 11 is guided by clamps or grippers 25 located on the sides (and/or top) of the wedge-shaped portion 23 of the stripping means 22. These clamps or grippers 25 serve the purpose of preventing the metal 11 from falling should complete separation of the metal 11 from the cathode plate 12 occur.

Figure 7:
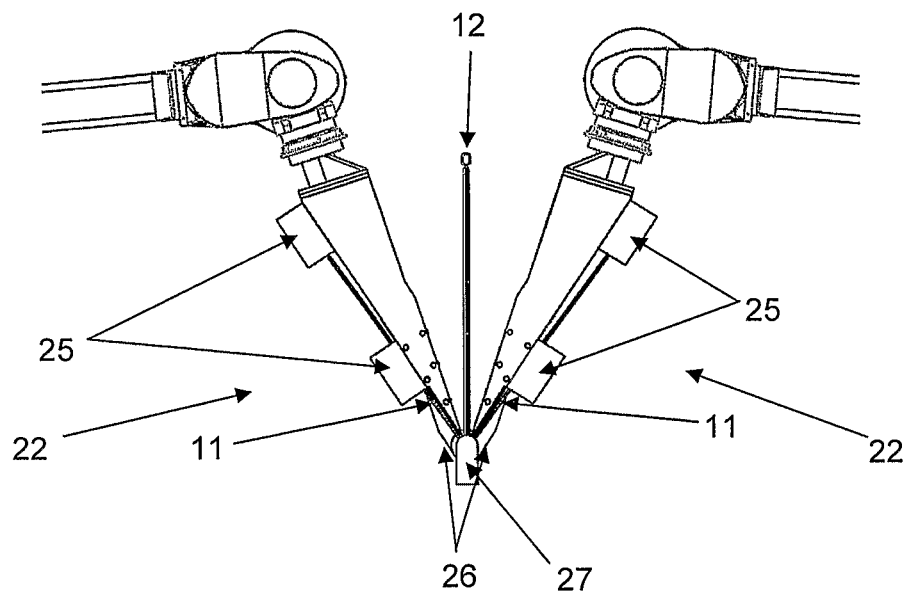

As shown in FIG. 7, once the stripping means 22 reaches the bottom of the cathode plate, the clamps or grippers 25 are activated, thereby gripping the metal 11. In addition, the stripping means 22 is provided with one or more U-shaped engagement means 26 adapted to engage with a shaft 27 the base of the cathode plate 12 in order to ensure that full separation of the metal 11 from the cathode plate 12 may be achieved by pivoting the metal 11 around the point of engagement between the engagement means 26 and the shaft 27. The shaft 27 may form part of or be attached to the frame of the stripping station in which the cathode plate is located during stripping of the metal.

Figure 8:
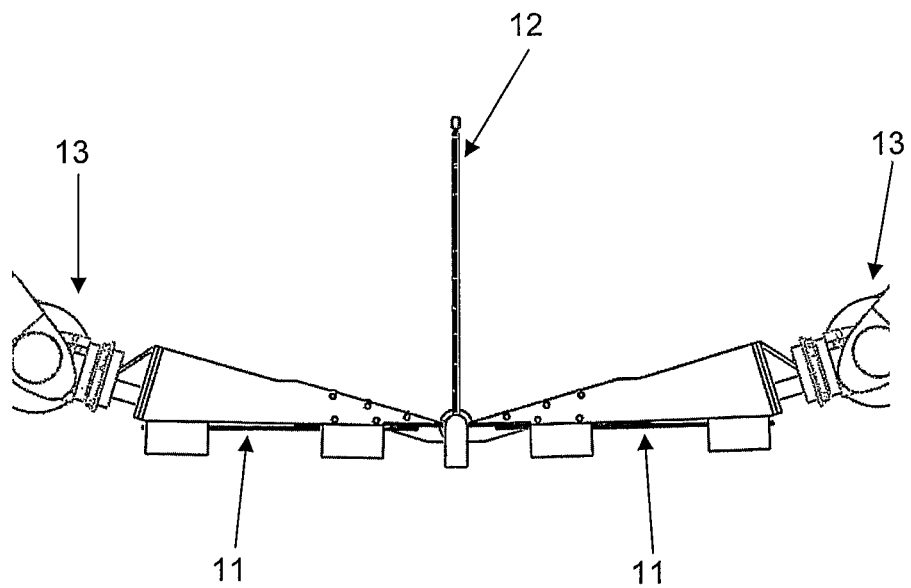
Figure 9:
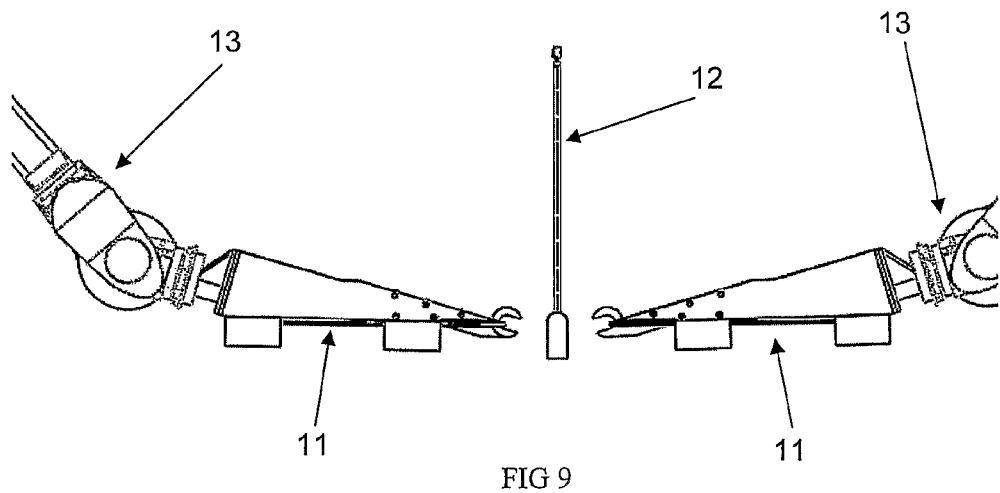

Turning now to FIG. 8, the robotic arms 13 are pivoted 90° or more from the vertical in order to break the layer of metal connecting the metal 11 to the cathode plate 12. If full separation of the metal 11 from the cathode plate 12 occurs, the robot arms 13 withdraw and the metal 11 is transported away from the stripping station (see FIG. 9).

Figure 10:
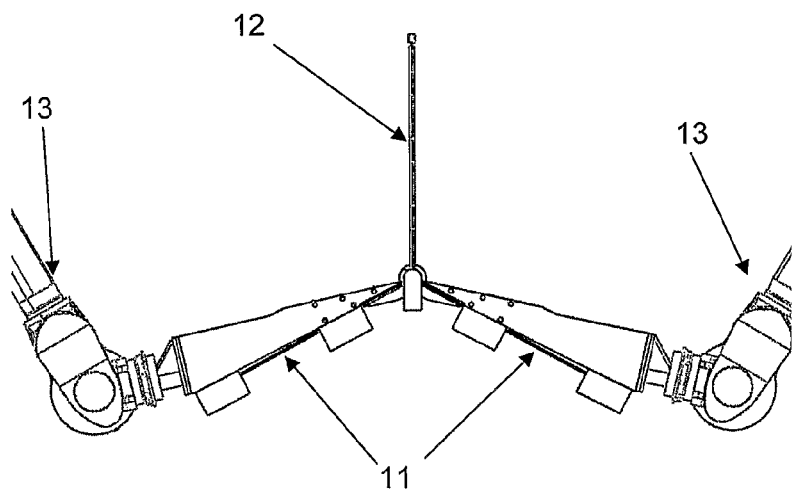

On the other hand, if separation of the metal 11 from the cathode plate 12 does not immediately occur, the robotic arms 13 pivot further (see FIG. 10) in order to achieve separation of the metal 11 from the cathode plate 12. The robotic arms may pivot repeatedly between the positions shown in FIGS. 8 and 10 until full separation of the metal 11 from the cathode plate 12 occurs.

Figure 11:
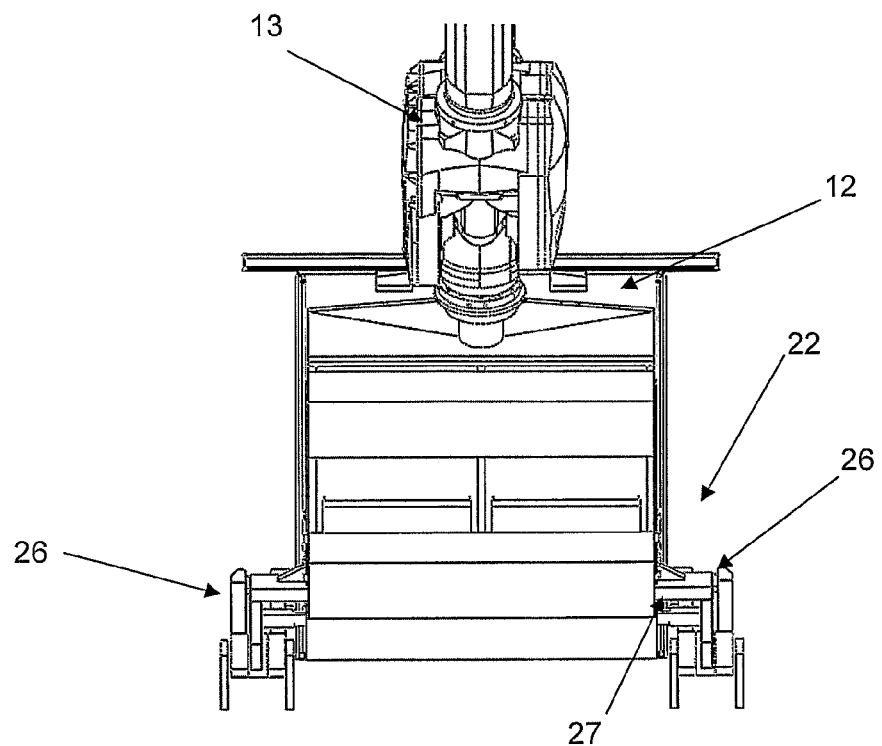
Figure 12:
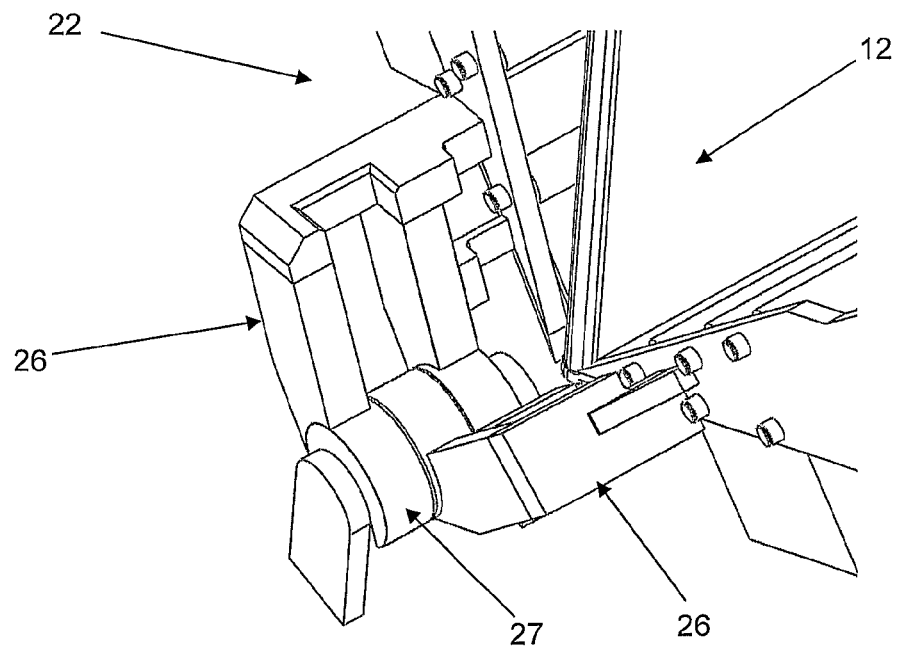
Figure 13:
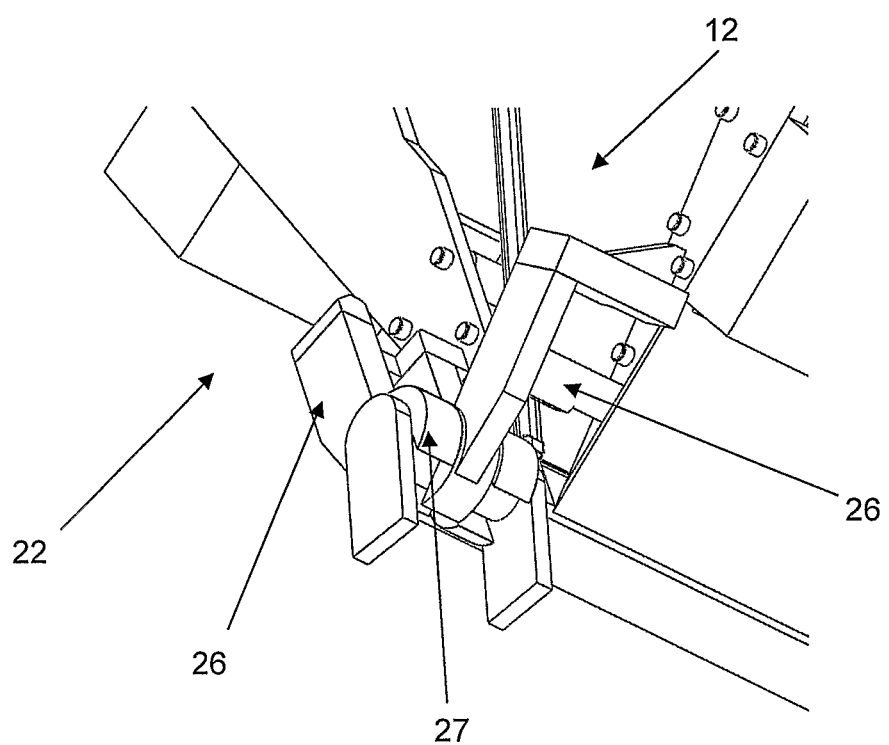

In FIGS. 11 to 13, the step illustrated in FIG. 7 is shown in greater detail. In these Figures, the robotic arms 13 have pushed the stripping means 22 to the base of the cathode plate 12. In case the metal (obscured) does not immediately separate from the cathode plate 12, the stripping means 22 comprises one or more U-shaped engagement means 26 which are adapted to clamp onto or otherwise grip a shaft 27 located at the base of the cathode plate 12.

Figure 14:
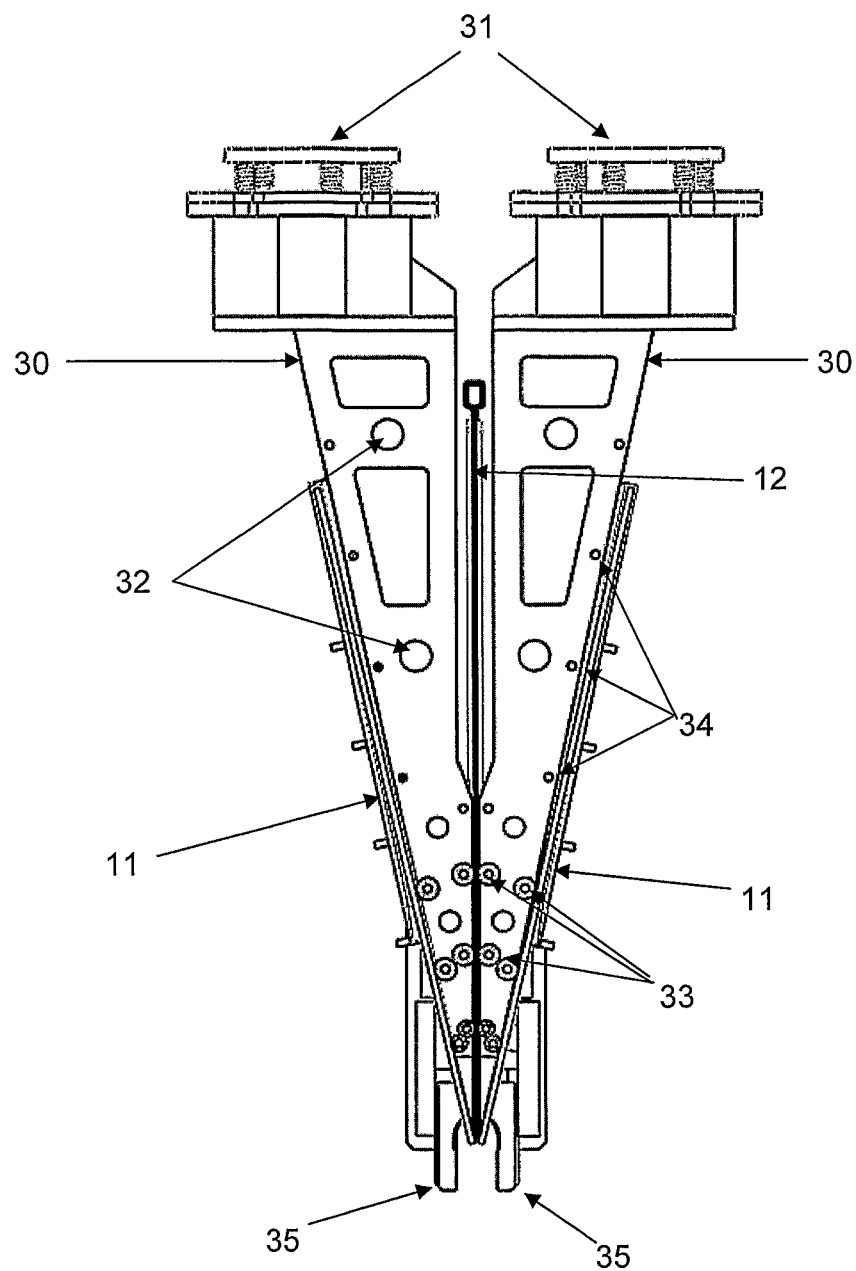
FIGS. 14-16 illustrate a part of the apparatus for stripping metal from a cathode plate according to an embodiment of the present invention.
Figure 15:
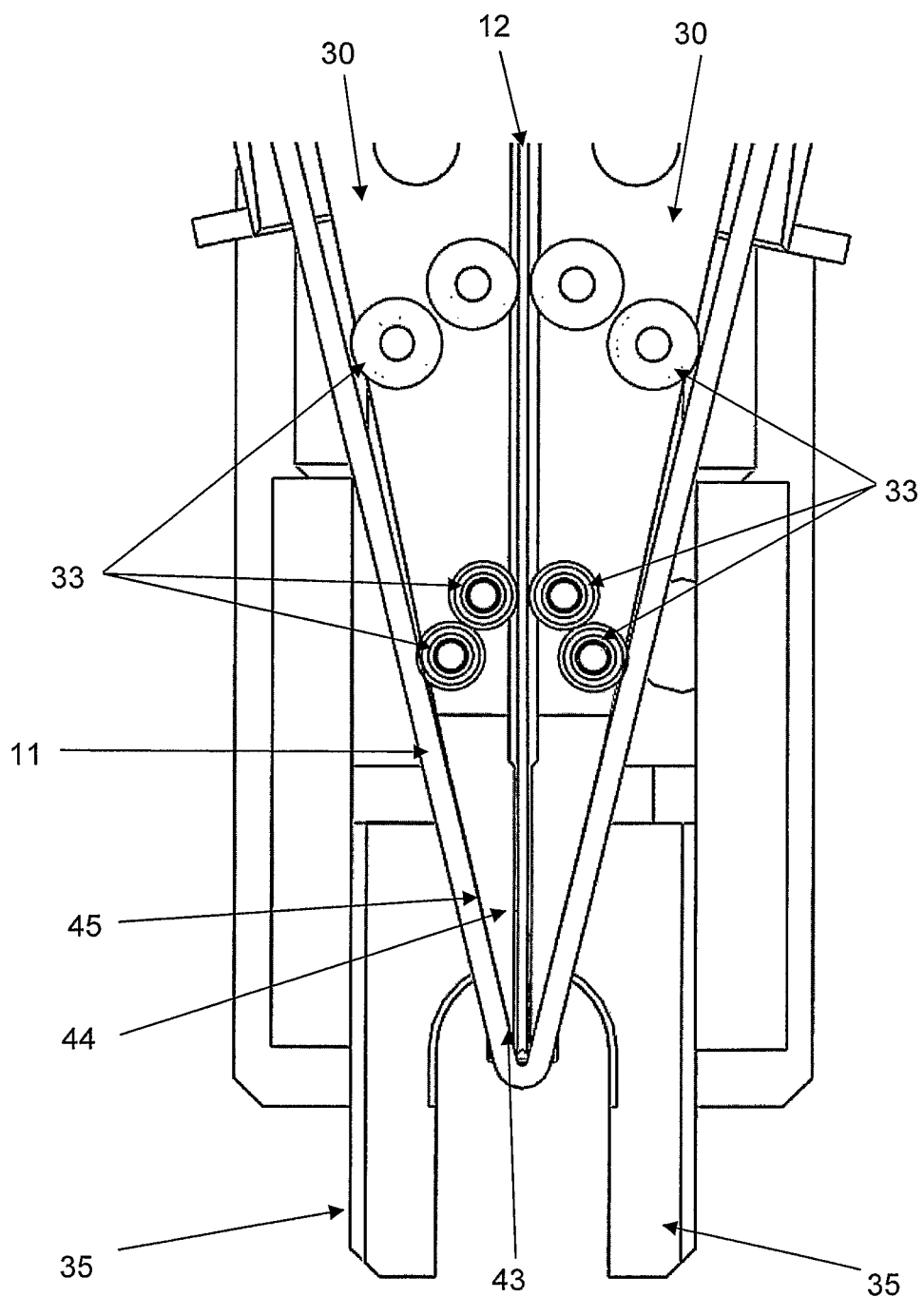

In FIGS. 14 and 15, an alternative embodiment of the present invention is illustrated. In these Figures, stripping means in the form of a pair of wedge-shaped portions 30 are illustrated inserted into the gap between a cathode plate 12 and a pair of metal sheets 11 located each side of the cathode plate 12. The wedge-shaped portions 30 are provided with connection means 31 that enable the wedge-shaped portions 30 to be connected to drive means, such as one or more robotic arms. The drive means have been omitted from FIGS. 14 and 15 for clarity.

The wedge-shaped portions 30 comprise a number of support bars 32 which extend across the width of the wedge-shaped portions 30 to give structural strength to the apparatus.

The wedge-shaped portions 30 further comprise a number of rollers 33 adapted to reduce friction between the wedge-shaped portions 30 and the cathode plate 12. The periphery of the rollers extends just slightly past the outer surface of the wedge shaped portions. Some of the rollers 33 are adapted to contact the surface of the cathode plate 12 while other rollers are adapted to contact the inner surface of the metal 11. In the embodiment of the invention illustrated in FIGS. 14 and 15, the wedge-shaped portions 30 are provided with a number of further apertures 34 in which additional rollers or bearings could be mounted if so desired.

The wedge-shaped portions 30 further comprise engagement means in the form of an arcuate portion 35 located at the lower part of the wedge-shaped portion 30. This arcuate portion 35 is adapted to engage with (and pivot about) a shaft (not shown) located at the lower end of the cathode plate 12. This shaft will typically be part of or be connected to the frame of the stripping station in which the cathode plate is located during stripping.

As can be most clearly seen in FIG. 15, the angle at the tip 43 of the wedge-shaped portion 30 (i.e. the angle between the vertical face 44 of the wedge-shaped portion 30 and the inclined face 45 of the wedge-shaped portion 30) is relatively low (no more than 20°, and preferably between about 10° and about 12°) in order to prevent or minimize outward bending of the metal sheet 11.

Figure 16:
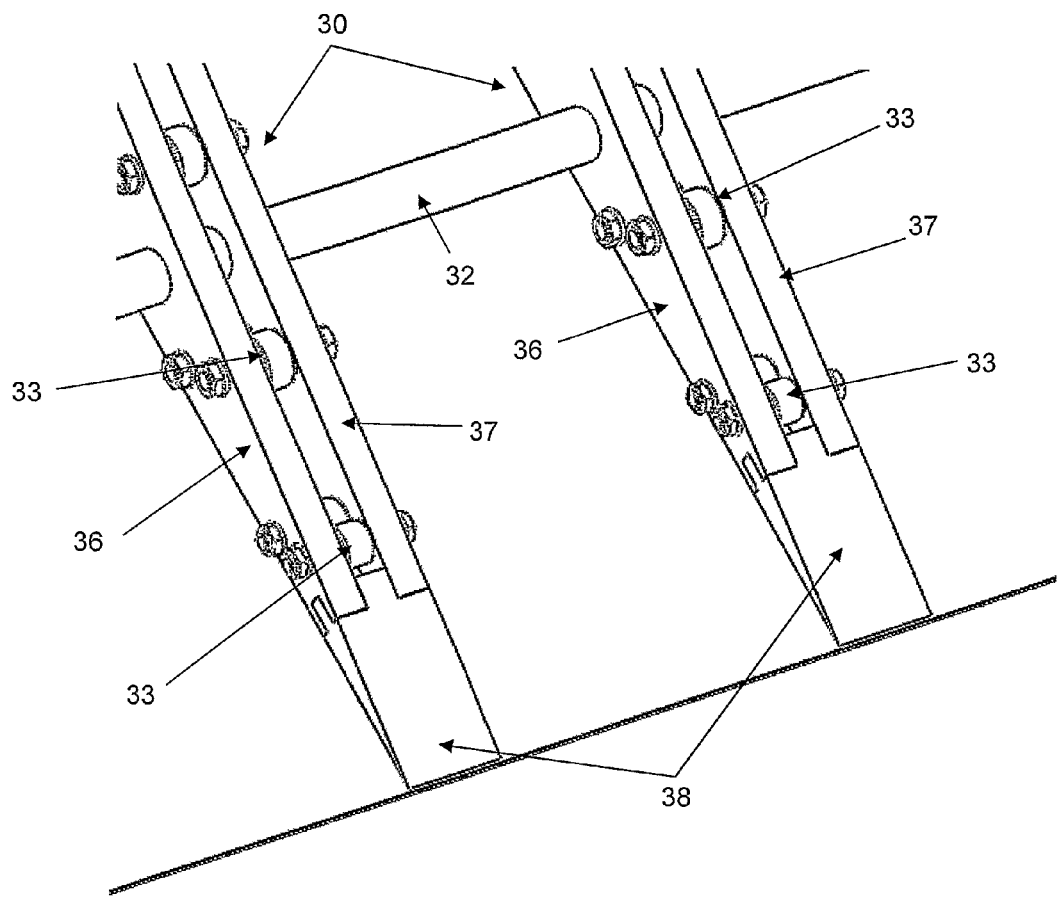

In FIG. 16, a pair of wedge-shaped portions 30 are illustrated. In this embodiment of the invention, the pair of wedge-shaped portions 30 are adapted for connection to the same drive means (e.g. robotic arm). To this end, the wedge-shaped portions 30 are interconnected by a support bar 32 in order to assist in keeping the wedge-shaped portions 30 correctly aligned.

It may be seen in FIG. 16 that each of the wedge-shaped portions comprises a pair of plates 36, 37 with a solid tip 38 located at the lower end thereof.

Intermediate the plates 36, 37 are located rollers 33, the rollers being adapted to contact the surface of the cathode plate (not shown) and/or the metal sheet (not shown) to reduce friction during the stripping process.

Figure 17:
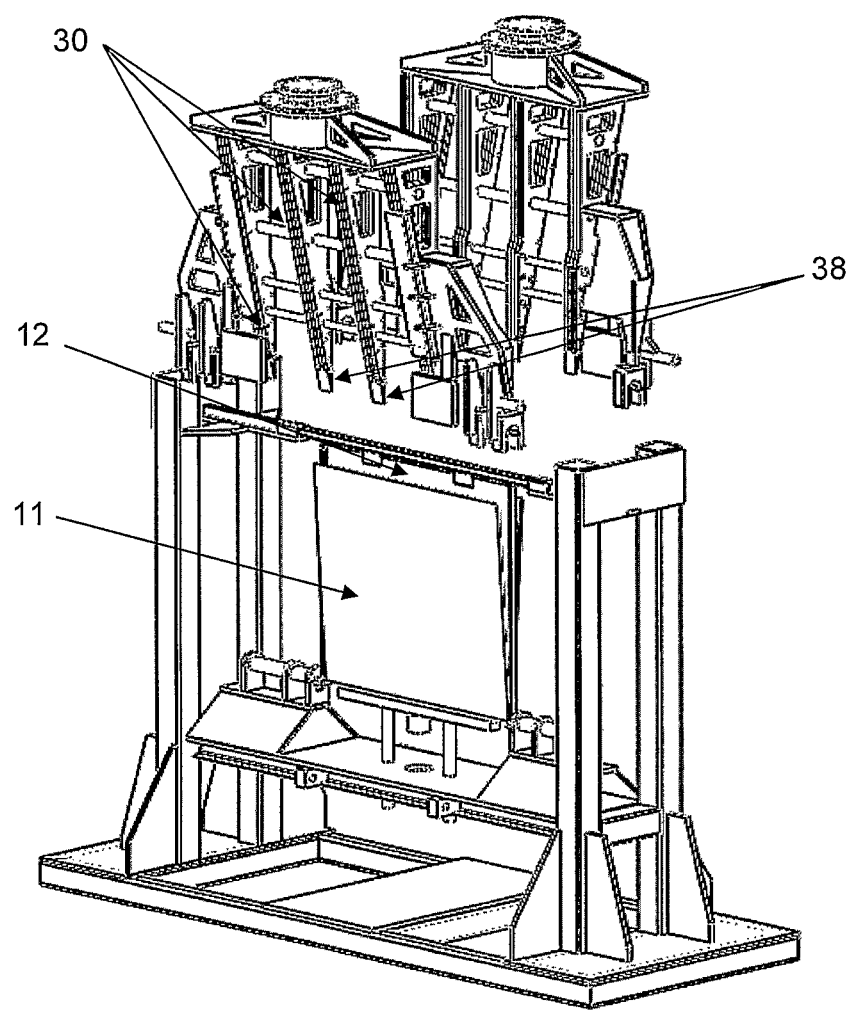
FIG. 17-27 illustrate an apparatus and method for stripping metal from a cathode plate according to an embodiment of the present invention.

In FIGS. 17 to 27, the steps in the method for stripping metal according to an embodiment of the present invention are illustrated. In FIG. 17, the metal sheets 11 have been separated from the cathode plate 12 by flexing, thereby creating a small gap between the cathode plate 12 and the metal 11. The stripping means, each comprising four wedge-shaped portions 30 are positioned vertically by the drive means (not shown) such that the tips 38 of the wedge-shaped portions 30 are positioned ready for insertion into the gap between the metal 11 and the cathode plate 12.

Figure 18:
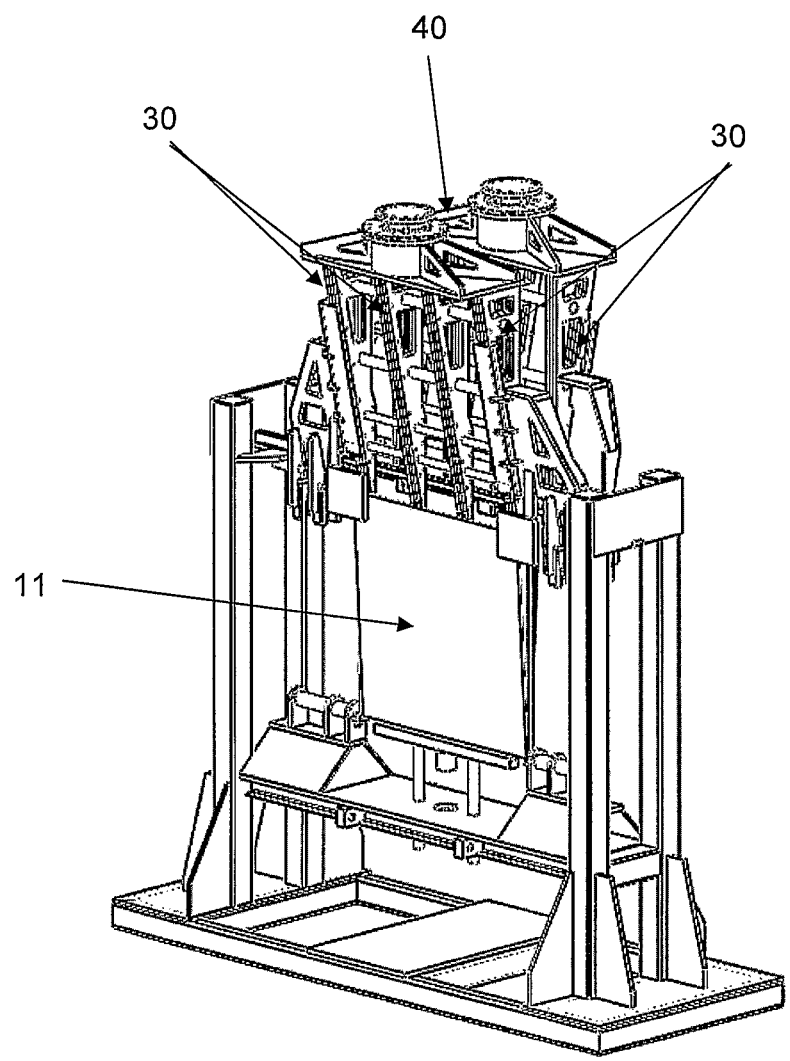
Figure 19:
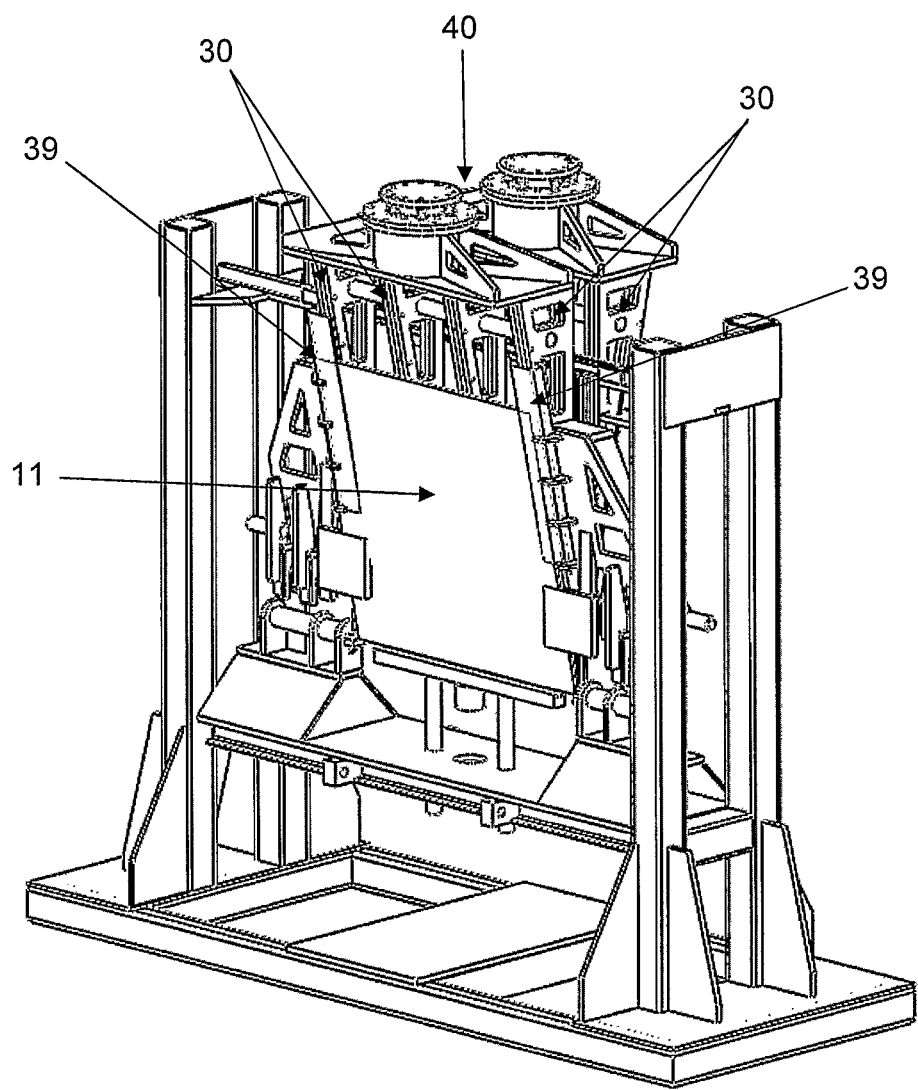

In FIGS. 18 and 19, the wedge-shaped portions 30 are driven downwards into the gap between the metal 11 and the cathode plate (obscured) and the metal 11 begins to be stripped from the cathode plate. Guides 39 are attached to the apparatus frame 40 and cover the edge of the metal 11, thereby preventing unwanted bending of the metal 11 while stripping is taking place.

Figure 20:
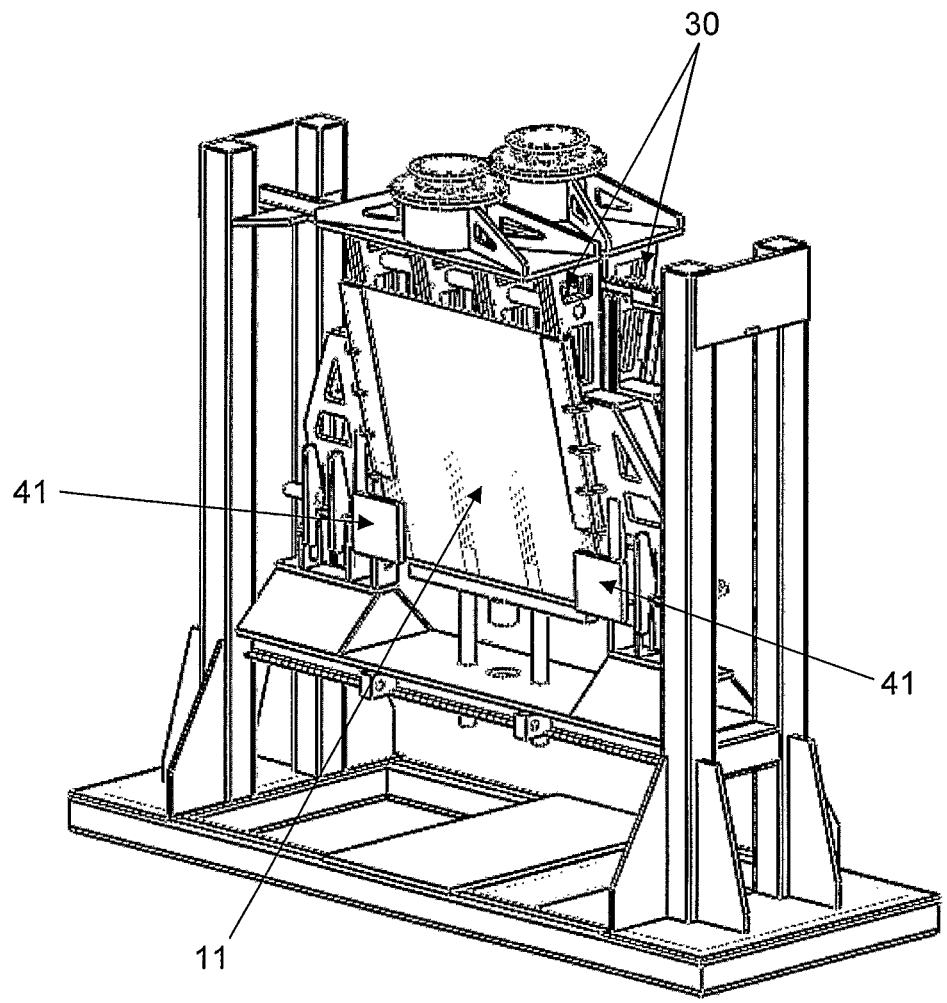
Figure 21:
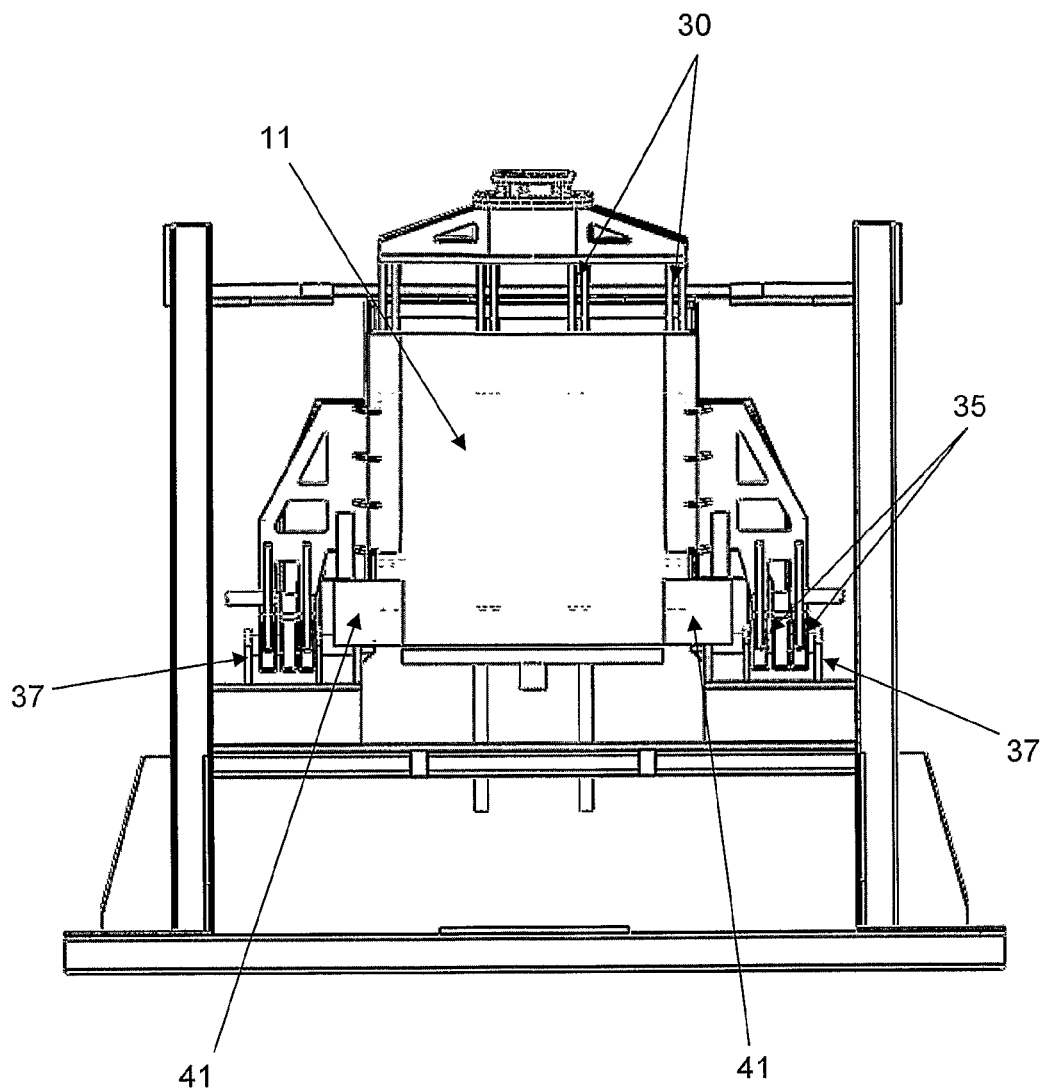

In FIGS. 20 and 21, the wedge-shaped portions 30 have been driven downwards to the bottom of the cathode plate (obscured). In this position, the arcuate portions 35 engage with a shaft 37 located at the bottom of the cathode plate (obscured). At this time, the gripping means 41 are actuated and grip the outer surface of the metal 11, thus preventing the metal 11 from falling if separation of the metal 11 from the cathode plate (obscured) occurs.

Figure 22:
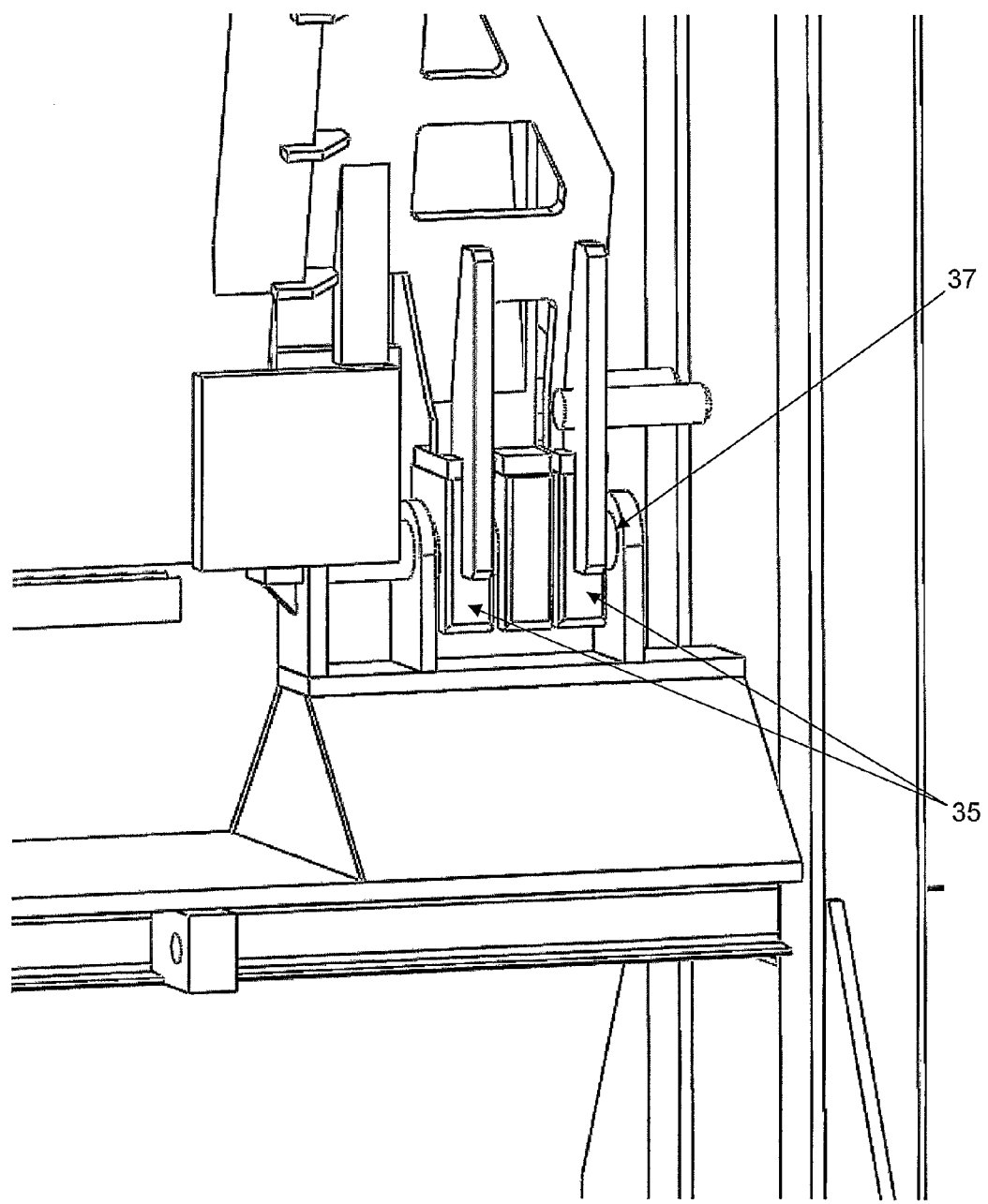

In FIG. 22, a detailed view of the engagement between the arcuate portions 35 and the shaft 37 may be seen.

Figure 23:
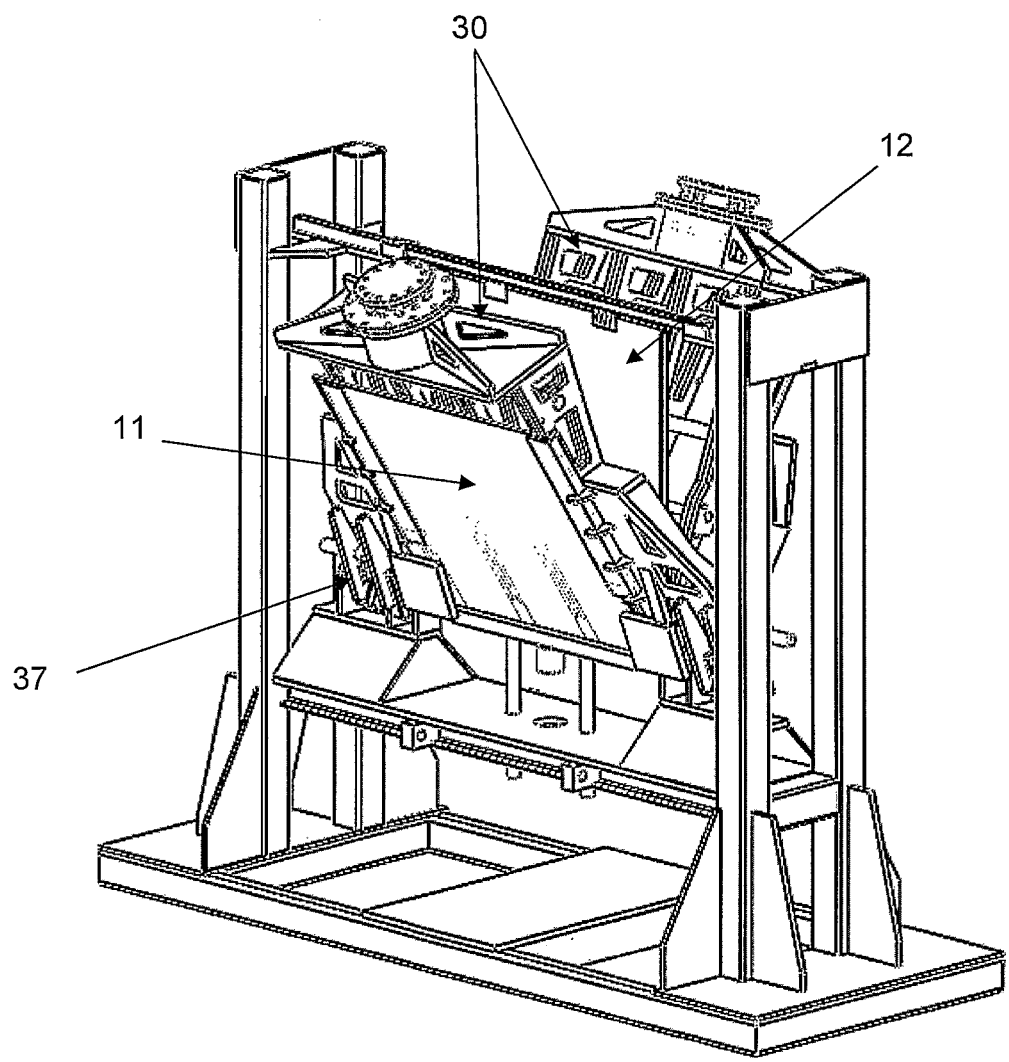

If the metal 11 does not immediately separate from the cathode plate 12, the wedge-shaped portions 30 may be pivoted about the axis of the shaft 37 in order to break the layer of metal connecting the metal 11 to the cathode plate 12. This step in the process is illustrated in FIG. 23. Operation of robotic arm driving means is a suitable arrangement for obtaining the desired movement.

In this Figure, the stripping means are pivoted outwards away from the vertical about the axis of the shaft 37.

Figure 24:
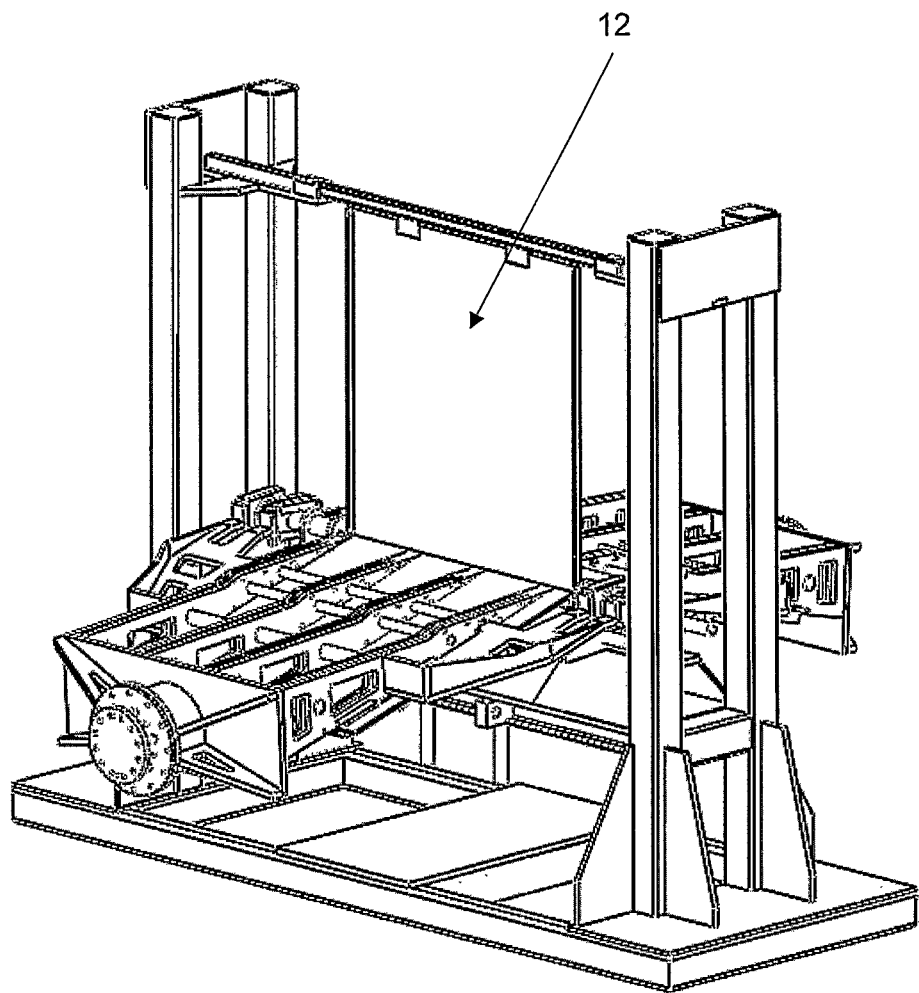

In FIG. 24, the stripping means are driven (for instance, by a robotic arm) so that they pivot 90° or more from their vertical starting position in order to attempt to separate the metal (obscured) from the cathode plate 12. If the metal (obscured) does not separate from the cathode plate 12, the steps of the method illustrated in FIGS. 23 and 24 may be repeated until such time as separation occurs.

Figure 25:
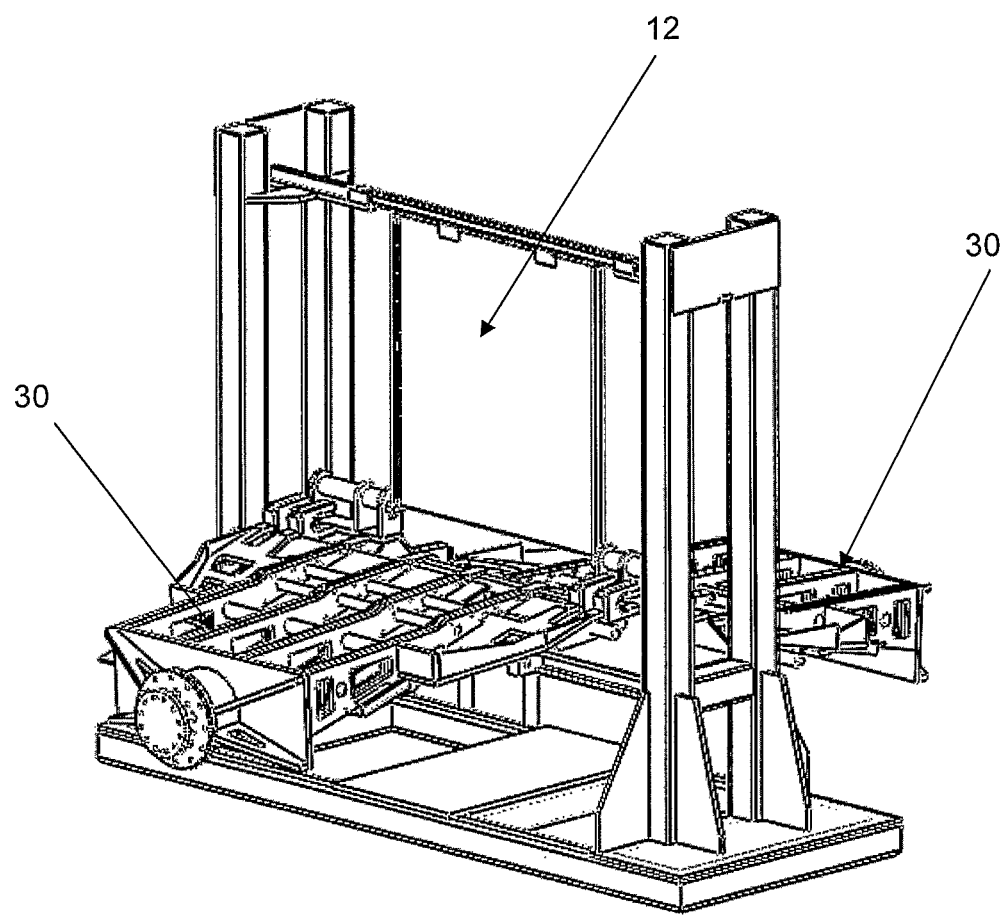
Figure 26:
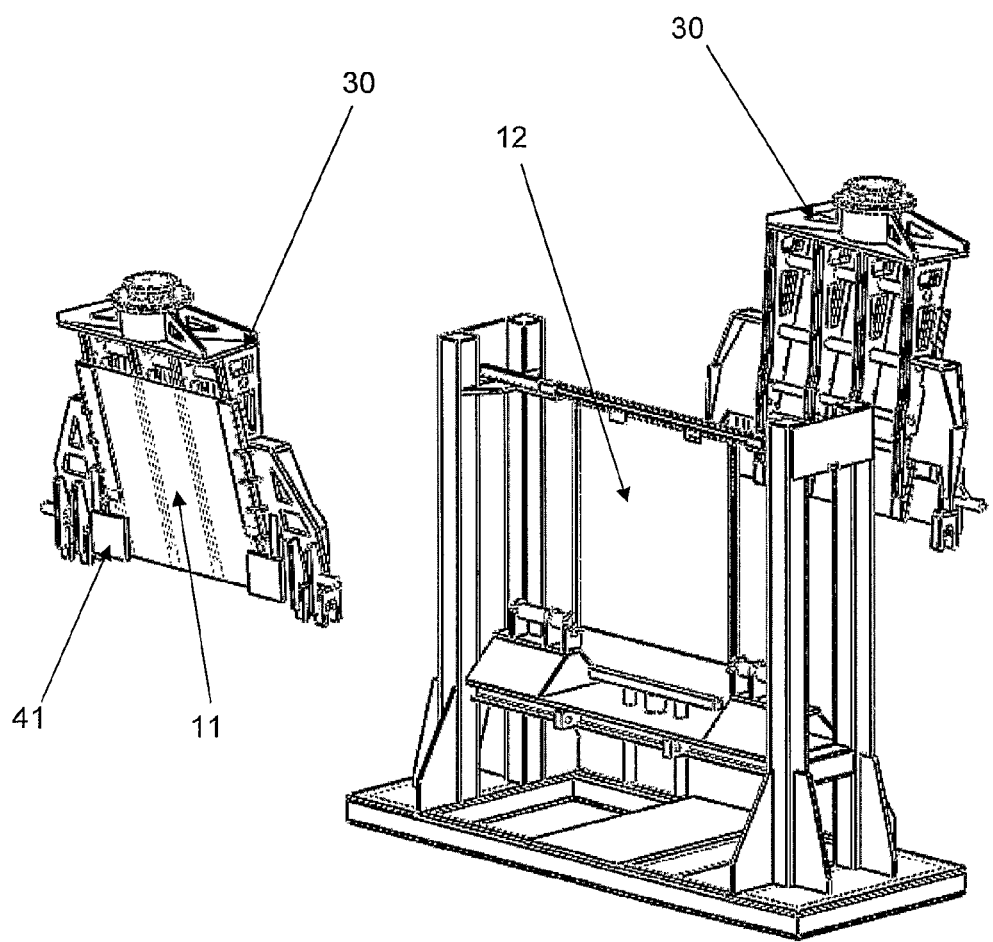

In FIGS. 25 and 26, the pivoting of the stripping means has resulted in the separation of the metal 11 from the cathode plate 12. Once separation has occurred, the wedge-shaped portions 30 begin to withdraw, and the metal sheets 11 are removed to, for instance, a stockpile. Removal of the metal sheets 11 to a stockpile is achieved using the robotic arm (not shown). In particular, once the metal 11 has been separated from the cathode plate 12, the gripping means 41 continue to grip the surface of the metal 11, thereby preventing the metal 11 from falling. While the gripping means 41 is in contact with the metal 11, the robotic arm (not shown) pivots or moves until the metal 11 is positioned over a stockpile, in a storage area or the like. The robotic arm will pivot or move such that the metal 11 will be positioned to be placed in the desired position on the stockpile or in the storage area. Once in the desired position, the gripping means 41 are released from the surface of the metal 11 so that the metal 11 may fall away from the wedge-shaped portions 30 and onto a stockpile or the like. The robotic arm (not shown) may then return the wedge-shaped portions 30 to the position shown in FIG. 17 ready to strip the metal from the next cathode.

The advantage of using the robotic arm to position the metal 11 on a stockpile or the like is that the robotic arm will quickly and simply transfer the stripped metal to the stockpile and will stack the stripped metal in a predictable and regular manner. This significantly increases the efficiency of the stripping process as the stripping process is not reliant on manual labour or the use of machinery (such as forklifts) to move the stripped metal from the stripping station to a stockpile.

Figure 27:
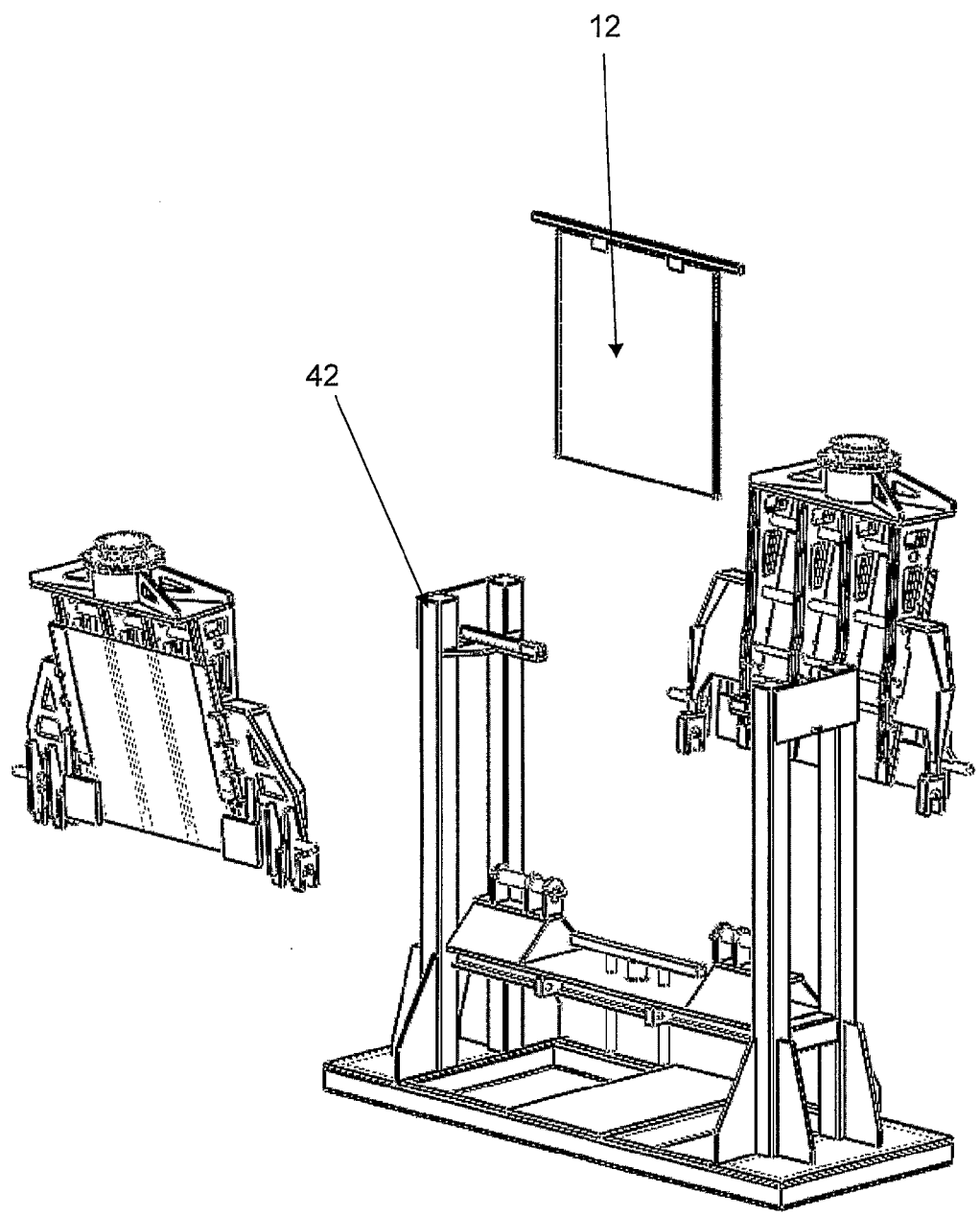

Finally, as shown in FIG. 27, the cathode plate 12 is removed from the stripping station 42 so that a new cathode plate (not shown) may be inserted and the stripping process may be carried out on the new cathode plate.

Throughout the specification the words "stripping" and "separation" have been used in a generic sense. However, within the present technology the terms "stripping" and "separation" are sometimes given a more particular meaning, in which "stripping" refers to the process of widening the gap between the metal and the cathode plate, and "separation" refers to the process of flexing the metal sheets (repeatedly if required) to break the bridge of deposited metal interconnecting the two metal sheets.

Those skilled in the art will appreciate that the present invention may be susceptible to variations and modifications other than those specifically described. It will be understood that the present invention encompasses all such variations and modifications that fall within its spirit and scope.

The invention claimed is:

1. An apparatus for stripping metal from a cathode plate, the apparatus comprising a stripping means adapted for positioning between the metal and the cathode plate to separate the metal from the cathode plate, wherein the stripping means that comprises a roller is pivotally mounted to a robotic arm having at least two or more hinged portions, wherein the robotic arm pivots about the hinged portions to pivot the stripping means 180° from a downward facing vertical position to a upward facing position causing the metal to separate from the cathode plate, the apparatus further comprising one or more gripping means adapted to prevent the metal from falling when separated from the cathode plate.

2. The apparatus according to claim 1 wherein actuation of the robotic arm drives the stripping means along the cathode plate or the metal or both so as to push the metal away from the cathode plate.

3. The apparatus according to claim 1 wherein the stripping means comprises at least one roller on one or both sides of the cathode plate for positioning in a gap between the metal and the cathode plate.

4. The apparatus according to claim 1 wherein the stripping means comprises at least two rollers positioned on one or both sides of the cathode plate, with one of the at least two rollers being in contact with the cathode plate and one of the at least two rollers being in contact with the metal.

5. The apparatus according to claim 1 wherein the apparatus further comprises one or more external rollers adapted to be brought into contact with an external surface of the metal wherein the metal deposited on the cathode plate does not break during stripping.

6. The apparatus according to claim 5 wherein the one or more external rollers are adapted to remain in contact with the external surface of the metal being stripped.

7. The apparatus according to claim 1 wherein the stripping means includes one or more insertion means adapted for insertion between the metal and the cathode plate to separate at least a portion of the metal from the cathode plate.

8. The apparatus according to claim 7 wherein the one or more insertion means includes one or more wedge-shaped portions.

* * * * *